United States Patent
Park et al.

(10) Patent No.: US 10,506,513 B2
(45) Date of Patent: Dec. 10, 2019

(54) METHOD FOR PERFORMING PAGING IN WIRELESS LAN SYSTEM AND DEVICE USING SAME

(71) Applicant: LG ELECTRONICS INC., Seoul (KR)

(72) Inventors: Giwon Park, Seoul (KR); Hyunhee Park, Seoul (KR); Dongcheol Kim, Seoul (KR); Byungjoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 15/554,129

(22) PCT Filed: Feb. 25, 2016

(86) PCT No.: PCT/KR2016/001874
§ 371 (c)(1),
(2) Date: Aug. 28, 2017

(87) PCT Pub. No.: WO2016/140466
PCT Pub. Date: Sep. 9, 2016

(65) Prior Publication Data
US 2018/0049123 A1    Feb. 15, 2018

Related U.S. Application Data

(60) Provisional application No. 62/126,720, filed on Mar. 2, 2015, provisional application No. 62/129,972, filed on Mar. 9, 2015.

(51) Int. Cl.
*G08C 17/00*      (2006.01)
*H04W 52/02*    (2009.01)
(Continued)

(52) U.S. Cl.
CPC ....... *H04W 52/0216* (2013.01); *H04W 68/02* (2013.01); *H04W 76/28* (2018.02);
(Continued)

(58) Field of Classification Search
CPC .. H04W 52/02; H04W 52/0203; H04W 84/12
See application file for complete search history.

(56) References Cited

U.S. PATENT DOCUMENTS

2005/0250474 A1* 11/2005 Hong .................... H04W 60/04
455/411
2009/0170534 A1   7/2009 Ryu et al.
(Continued)

FOREIGN PATENT DOCUMENTS

KR    10-2008-0110294 A    12/2008
KR    10-2011-0084252 A    7/2011
(Continued)

*Primary Examiner* — Siren Wei
(74) *Attorney, Agent, or Firm* — Dentons US LLP

(57) ABSTRACT

Provided are a method and a device for performing paging in a wireless LAN system. Specifically, during a preset discovery window, a paging group information message comprising a paging group ID and a paging offset is received, the paging group ID indicating at least one receiving station receiving a paging message, and the paging offset indicating the transmission time of the paging message. The paging message is received according to the paging offset, wherein the paging message comprises: a paging ID indicating a receiving station transmitting a PS-poll frame; and a PS-poll offset indicating the PS-poll frame transmission time. The PS-poll frame is transmitted according to the PS-poll offset.

11 Claims, 19 Drawing Sheets

(51) Int. Cl.
*H04W 68/02* (2009.01)
*H04W 84/12* (2009.01)
*H04W 76/28* (2018.01)
*H04W 72/04* (2009.01)

(52) U.S. Cl.
CPC .......... *H04W 84/12* (2013.01); *H04W 72/042* (2013.01); *Y02D 70/14* (2018.01); *Y02D 70/142* (2018.01)

(56) References Cited

U.S. PATENT DOCUMENTS

| | | | |
|---|---|---|---|
| 2009/0286532 A1* | 11/2009 | Nigam | H04W 52/0229 455/426.1 |
| 2010/0093378 A1* | 4/2010 | Chin | H04W 68/00 455/458 |
| 2011/0223942 A1* | 9/2011 | Xu | H04W 68/00 455/458 |
| 2014/0003234 A1* | 1/2014 | Chou | H04W 4/70 370/230 |
| 2014/0003391 A1* | 1/2014 | Vesterinen | H04L 47/34 370/331 |
| 2014/0029597 A1* | 1/2014 | Chu | H04W 52/0206 370/338 |
| 2015/0009879 A1* | 1/2015 | Kim | H04W 74/06 370/311 |

FOREIGN PATENT DOCUMENTS

| | | |
|---|---|---|
| KR | 10-2012-0041140 A | 4/2012 |
| WO | 2014-011006 A1 | 1/2014 |

\* cited by examiner

FIG. 5
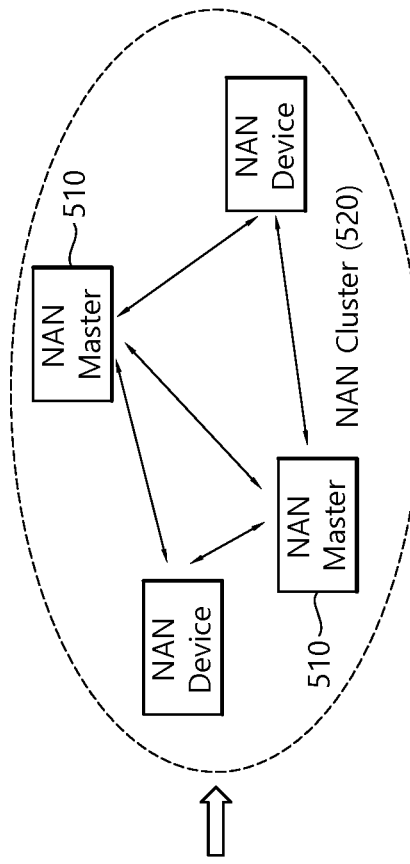
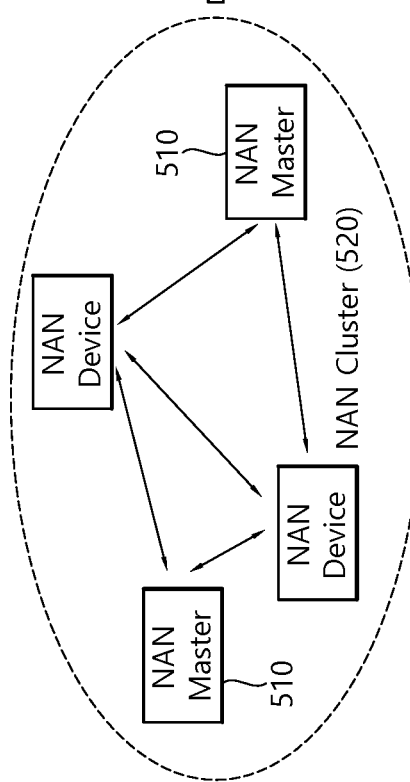

METHOD FOR PERFORMING PAGING IN WIRELESS LAN SYSTEM AND DEVICE USING SAME

CROSS-REFERENCE TO RELATED APPLICATIONS

This application is the National Stage filing under 35 U.S.C. 371 of International Application No. PCT/KR2016/001874, filed on Feb. 25, 2016, which claims the benefit of U.S. Provisional Applications No. 62/126,720 filed on Mar. 2, 2015, and No. 62/129,972 filed on Mar. 9, 2015, the contents of which are all hereby incorporated by reference herein in their entirety.

BACKGROUND OF THE INVENTION

Field of the Invention

The present invention relates to wireless communication and, more particularly, to a method for performing paging in a wireless local area network (WLAN) system and a device using the method.

Related Art

Along the recent advances of information and communication technology, various wireless communication technologies are being developed. Among them, WLAN technology, based on radio frequency technologies, enables users to access the Internet wirelessly at home, office, or in a specific service area by using their portable devices such as Personal Digital Assistants (PDAs), laptop computers, or Portable Multimedia Players (PMPs).

The IEEE 802.11n is a technology standard established relatively recently to overcome the limitation of the communication speed of WLAN which has been pointed out as a weak point thereof. The IEEE 802.11n aims to improve the speed and reliability of a wireless network and to extend the operating range of the wireless network. More specifically, the IEEE 802.11n defines a High Throughput (HT) WLAN which supports a data rate of up to 540 Mbps or higher and is based on the MIMO (Multiple Inputs and Multiple Outputs) technology which employs multiple antennas at both sides of the transmitter and receiver to minimize transmission error and optimize data speed.

The WLAN system supports active and power save modes as operating modes for a station (STA). The active mode refers to an operating mode in which an STA operates in an awake state to transmit and receive frames. On the other hand, the power save mode (PSM) is supported for power saving of STAs which don't have to be in an active state for reception of frames. An STA supporting the PSM may prevent unnecessary power consumption by operating in a doze state when the STA is not allowed to access a radio medium for a particular time period. In other words, an STA supporting the PSM operates in the awake state only for a time period in which frames may be transmitted to the corresponding STA or in which the corresponding STA is allowed to transmit frames.

In the WLAN system, an access point (AP) manages traffic to be transmitted to those STAs operating in the power save mode. In the presence of buffered traffic to be transmitted to a specific STA, a method for informing the corresponding STA of the presence of buffered traffic and transmitting the traffic is required. Also, there is a need for a method for an STA operating in the doze state to determine existence of buffered traffic for the STA, to switch to the awake state in the existence of buffered traffic, and to receive frames in a proper manner.

SUMMARY OF THE INVENTION

The present invention provides a method for performing paging in a WLAN system and a device using the method.

The present document proposes a method for performing paging in a WLAN system.

First of all, a preset discovery window (DW) may correspond to a discovery window set within an interval between current DWs. A receiving station may correspond to a NAN device to which an embodiment of the present invention is applied.

During a preset discovery window, a receiving station receives a paging group information message including a paging group ID and a paging offset. The paging group ID indicates at least one receiving station receiving a paging message. The paging offset indicates transmission time of a paging message. In other words, at least one receiving station may correspond to a group of NAN devices capable of receiving a paging message at the same time by applying the same paging offset. The paging group information message may be received by being included in a service discovery frame.

A receiving station receives a paging message according to the paging offset of the received paging group information message. A paging message includes a paging ID and PS-poll offset. The paging message indicates a receiving station transmitting a PS-poll frame. In other words, a paging ID is included in the paging message if there exists buffered traffic for the receiving station. The PS-poll offset indicates transmission time of a PS-poll frame.

A receiving station transmits a PS-poll frame at the transmission time indicated by the PS-poll offset. The receiving station may receive data after receiving an ACK with respect to the PS-poll frame. By doing so, a network connection among the NAN devices is performed.

If a NAN device supports a multi-channel operation, paging may be performed so that a paging message between NAN devices is extended to multiple channels. Here, a first channel may correspond to a listen channel receiving a paging group information message, and a second channel may correspond to a switched channel indicated by multi-channel information.

First, a paging group information message is received through a first channel. A multi-channel operation may be described by three embodiments. First, if a paging group information message further includes multi-channel information, a paging message is received through a second channel indicated by the multi-channel information according to a paging offset. In the same manner, a PS-poll frame is transmitted from the second channel indicated by the multi-channel information according to a PS-poll offset. At this time, the receiving station may receive ACK with respect to a PS-poll frame and data from the second channel.

Second, if a paging message is received through the first channel like the paging group information message, multi-channel information is further included in the paging message. At this time, only the PS-poll frame is transmitted from the second channel indicated by the multi-channel information according to the PS-poll offset. At this time, the receiving station may receive an ACK with respect to the PS-poll frame and data from the second channel.

Third, while the paging message further include multi-channel information, a receiving station may receive a paging group information message and a paging message from the first channel, transmit a PS-poll frame from the first channel and receive an ACK, and receive data from the second channel indicated by multi-path channel information.

Here, the receiving station operates in a power save mode. Therefore, the receiving station, after being in a doze state, enters an awake state to receive a control signal during a preset window. Also, if a discovery window interval expires after the receiving station receives a paging group information message, the receiving station enters again the doze state again before receiving a paging message. In this regard, a paging offset indicates an interval between the time the discovery window interval expires and the time the receiving station receives a paging message.

Also, although the receiving station stays in the awake state when receiving a paging message, the receiving station again enters the doze state before transmitting a PS-poll frame after receiving the paging message. In this regard, the PS-poll offset indicates an interval between the time the receiving station receives the paging message and the time the receiving station transmits a PS-poll frame.

The paging message may further include a paging group ID. Also, the paging group ID may be assigned in advance through a service discovery frame during an association and authentication procedure.

A paging ID is included in the paging message if there exists buffered traffic for the receiving station. In other words, even if the receiving station includes a paging group ID, the paging ID is not included in the paging message if there is actually no buffered traffic. The receiving station checks that no paging ID for the receiving station is included in the paging message and enters the doze state before the discovery window next to a preset discovery window is initiated.

Also, the present invention proposes a wireless device performing paging in the WLAN system. The wireless device comprises a transceiver transmitting and receiving radio signals; and a processor connected to the transceiver. The processor receives a paging group information message including a paging group ID and paging offset during a preset discovery window. The paging group ID indicates at least one receiving station receiving a paging message. The paging offset indicates transmission time of a paging message. In other words, at least one receiving station may correspond to a group of NAN devices capable of receiving a paging message at the same time by applying the same paging offset. The paging group information message may be received by being included in a service discovery frame.

Also, the processor receives a paging message according to the paging offset of the received paging group information message. A paging message includes a paging ID and PS-poll offset. The paging message indicates a receiving station transmitting a PS-poll frame. In other words, a paging ID is included in the paging message if there exists buffered traffic for the receiving station. The PS-poll offset indicates transmission time of a PS-poll frame.

Also, the processor transmits a PS-poll frame at the transmission time indicated by the PS-poll offset. The receiving station may receive data after receiving an ACK with respect to the PS-poll frame. By doing so, a network connection among the NAN devices is performed.

By applying an embodiment of the present invention, power consumption due to a paging message and data of NAN devices may be reduced. Contention due to transmission of a PS-poll frame may be distributed. Also, since a paging offset is set differently for each paging group, NAN devices may receive a paging message according to the respective paging groups. Therefore, contention may be reduced, which is generated as NAN devices transmit PS-poll frames simultaneously. In other words, paging messages may be received being distributed according to their paging group ID. Also, the present invention may prevent each individual NAN device from being kept to the awake state even when there is no buffered traffic directed to the corresponding NAN device. This feature may improve power efficiency of NAN devices in the WLAN system.

BRIEF DESCRIPTION OF THE DRAWINGS

FIGS. 4 and 5 illustrate a NAN cluster.

DESCRIPTION OF EXEMPLARY EMBODIMENTS

Figure 1:
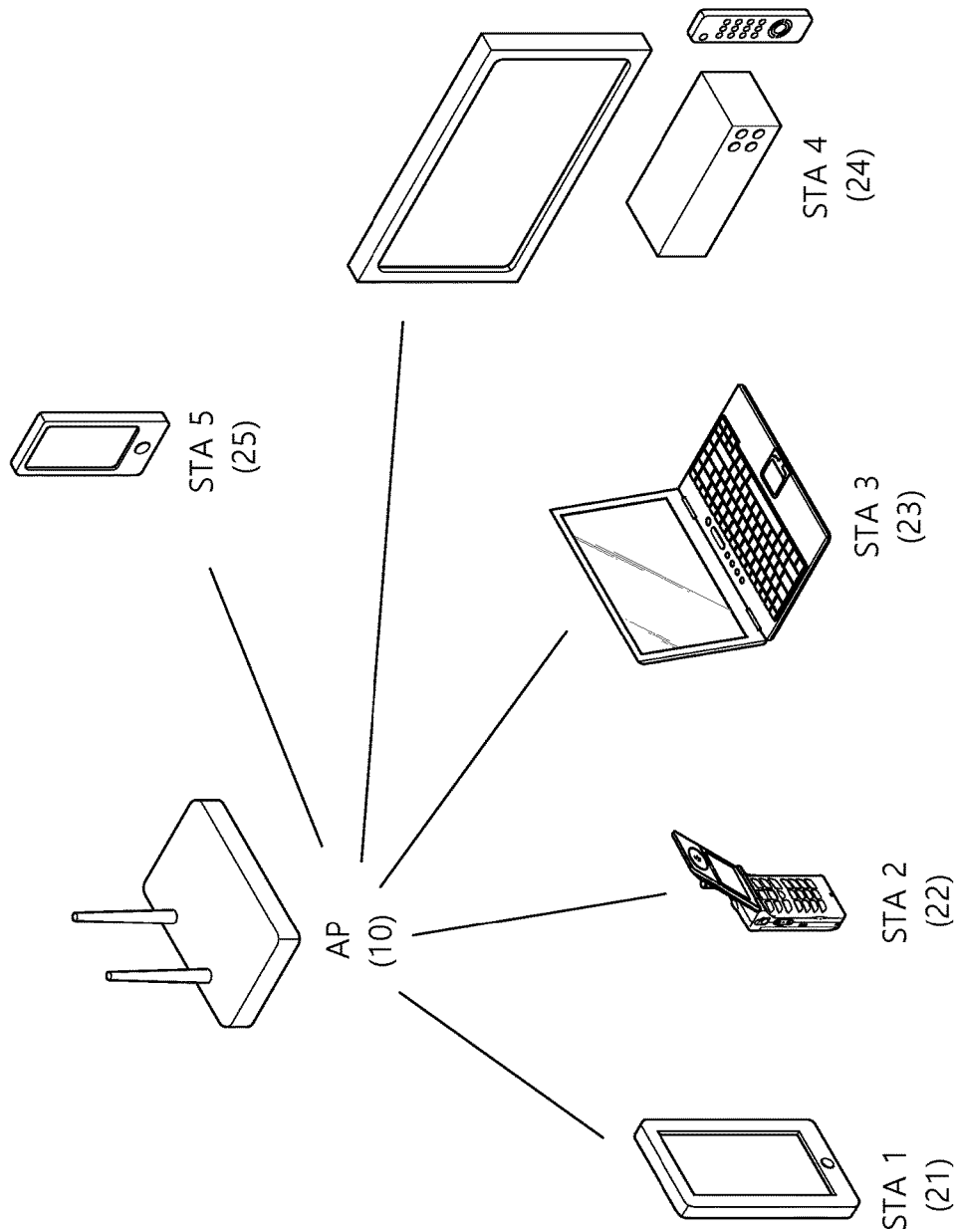
FIG. 1 illustrates the structure of a Wireless Local Area Network (WLAN) system to which an embodiment of the present invention may be applied.

FIG. 1 illustrates the structure of a Wireless Local Area Network (WLAN) system to which an embodiment of the present invention may be applied.

A WLAN system includes one or more basic service set (BSS). A BSS is a set of stations (STAs) being successfully synchronized and communicate with each other, which is not a concept applicable only to a specific area.

An infrastructure BSS includes one or more non-AP stations (non-AP STA1, non-AP STA2, non-AP STA3, non-AP STA4, non-AP STA5) and a distribution system (DS) connecting an AP (Access Point) providing a distribution service to a plurality of other Aps. In the infrastructure BSS, an AP manages non-AP STAs of the BSS.

Meanwhile, an Independent BSS (IBSS) is such a kind of BSS operating in the ad-hoc mode. Since an IBSS does not include an AP, it does not have a centralized management entity. In other words, in the IBSS, non-AP STAs are managed in a distributed manner. In the IBSS, all of STAs may be mobile STAs and form a self-contained network since access to a DS is not allowed.

An STA refers to an arbitrary functional medium including the Medium Access Control (MAC) interface and physical layer interface for a wireless medium, compliant with the IEEE (Institute of Electrical and Electronics Engineers) 802.11 standard and include both of AP and non-AP stations in a broad sense.

A non-AP STA is an STA which is not an AP, which may be called alternatively a mobile terminal, wireless device, Wireless Transmit/Receive Unit (WTRU), User Equipment (UE), Mobile Station (MS), or mobile subscriber unit. In what follows, for the convenience of description, the non-AP STA is called an STA.

An AP is a functional entity providing connectivity to a DS via a wireless medium for associated STAs. In the infrastructure BSS including an AP, communication between STAs is performed via the AP by default; however, direction communication between STAs is also possible when a direct links is established. The AP may also be called a central controller, Base Station (BS), node-B, Base Transceiver System (BTS), or site controller.

A plurality of infrastructure BSSs including a BSS may be connected to each other through a distribution system (DS). A plurality of BSSs connected to each other through the DS is called an Extended Service Set (ESS). Aps and/or STAs belonging to an ESS may communicate with each other, and in the same ESS, an STA may move from one BSS to another BSS while performing communication seamlessly.

In FIG. 1, STAs 21, 22, 23, 24, 25 may obtain AIDs (Association IDs) as they are being associated with the AP 10. An AID is uniquely defined within one BSS. As one example, in the current WLAN system, the AID may be assigned to one of the values from 1 to 2007. In this case, 14 bits may be allocated to the frame transmitted by the AP and/or STA to express the AID; although the AID value may be assigned to one of the values up to 16383, the values from 2008 to 16383 may be reserved for later use.

In the WLAN system compliant with the IEEE 802.11 specification, the basic access mechanism of the MAC (Medium Access Control) is the CSMA/CA (Carrier Sense Multiple Access with Collision Avoidance) mechanism. The CSMA/CA mechanism is also called Distributed Coordination Function (DCF) of the IEEE 802.11 MAC, which basically employs the "listen before talk" access mechanism. In such a kind of access mechanism, an AP and/or STA senses a radio channel or medium before starting transmission. As a result of sensing, if the medium is found to be in an idle status, frame transmission is started through the corresponding medium. On the other hand, if it is sensed that the medium is in an occupied status, the corresponding AP and/or STA sets a delay period for medium access and waits for that period instead of starting its own transmission.

The CSMA/CA mechanism supports virtual carrier sensing in addition to the physical carrier sensing by which an AP and/or an STA senses a medium directly. The virtual carrier sensing aims to compensate for the problem that may arise from media access, such as the hidden node problem. To implement the virtual carrier sensing, the MAC of the WLAN system employs the Network Allocation Vector (NAV). The NAV is a value set by an AP and/or an STA which currently occupies a medium or has a right to use the medium, where the value, set for the other APs and/or STAs, corresponds to the amount of time left until the medium becomes available. Therefore, the value designated as the NAV corresponds to a time period during which the medium is supposed to be used by the AP and/or STA transmitting the corresponding frame.

In addition to the DCF, the IEEE 802.11 MAC protocol provides the HCF (Hybrid Coordination Function) based on the PCF (Point Coordination Function) which periodically polls according to a DCF and polling-based synchronous access method so that all of the receiving APs and/or STAs may receive data frames. The HCF has two channel access methods for a provider to provide a data frame to a plurality of users: contention-based EDCA (Enhanced Distributed Channel Access) and non-contention based HCCA (HCF Controlled Channel Access) utilizing a polling mechanism. The HCF includes a medium access mechanism for improving QoS (Quality of Service) of the WLAN and may transmit QoS data according to both of the contention period (CP) and contention free period (CFP).

The IEEE 802.11n is a technology standard established relatively recently to overcome the limitation of the communication speed of the WLAN which has been pointed out as a weak point thereof. The IEEE 802.11n aims to improve the speed and reliability of a wireless network and to extend the operating range of the wireless network. More specifically, the IEEE 802.11n defines a High Throughput (HT) WLAN which supports a data rate of up to 540 Mbps or higher and is based on the MIMO (Multiple Inputs and Multiple Outputs) technology which employs multiple antennas at both sides of the transmitter and receiver to minimize transmission error and optimize data speed.

With a wide spread of the WLAN and various new applications based thereupon, a need for a new WLAN system capable of supporting a higher processing rate than the data processing rate supported by the IEEE 802.11n system is emerging. The WLAN system supporting the Very High Throughput (VHT) is the next version of the IEEE 802.11n WLAN system, which is one of the IEEE 802.11 WLAN systems recently proposed to support a data processing rate higher than 1 Gbps at the MAC Service Access Point (SAP).

The next-generation WLAN system supports a transmission method based on the MU-MIMO (Multi User Multiple Input Multiple Output) scheme by which a plurality of STAs access a channel simultaneously to utilize a radio channel in an efficient manner. According to the MU-MIMO transmission method, the AP may transmit a packet to one or more MIMO-paired STAs simultaneously.

TV WS refers to frequency bands left unused due to digitization of analog TV in the US, for example, the frequency spectrum between 54 and 698 MHz. However, the aforementioned spectrum is only an example, and TV WS may be referred to as a licensed band permitted to be used first by a licensed user. The licensed user refers to the user who is permitted to use the licensed band and may also be called a licensed device, a primary user, or an incumbent user.

APs and/or STAs operating in the TV WS need to provide a function for protecting a licensed user; this is so because a licensed user has a priority in using the TV WS spectrum. For example, suppose a licensed user such as a microphone is already using a specific WS channel which is a frequency band divided by the convention to have specific frequency bandwidth in the TV WS frequency band. In this case, to protect the licensed user, the AP and/or STA is unable to use the frequency band corresponding to the specific WS channel. Also, if the licensed user attempts to use the frequency band currently used for frame transmission and/or reception, the AP and/or STA has to stop using the corresponding frequency band.

Therefore, the AP and/or STA has to check whether a specific frequency band within the TV WS spectrum is available; in other words, a procedure for determining whether a licensed user is using the frequency band has to be performed first. The operation of determining whether a licensed user is using a specific frequency band is called spectrum sensing. The spectrum sensing mechanism may be embodied by using the energy detection technique, signature detection technique, or other relevant ones. If strength of a received signal is larger than a predetermined value, it may be determined that a licensed user is using the corresponding frequency band; if a DTV preamble is detected, it may be determined that a licensed user is using the corresponding frequency band.

Meanwhile, sensing a channel continuously for frame transmission and reception causes continuous power consumption of the STA. Since the power consumed in the reception state is not greatly different from the power consumed in the transmission state, being kept in the reception state causes the STA operated by battery to consume relatively large power. If the STA in the WLAN system is being kept in a reception-waiting state while continuously sensing a channel, no particular improvement is gained in terms of WLAN processing rate, but inefficient power consumption may be caused. Therefore, it may not be appropriate in terms of power management.

To compensate for the problem above, the WLAN system supports the power management (PM) mode of the STA. The power management mode of the STA is divided to an active mode and a power save (PS) mode. By default, an STA operates in the active mode. The STA operating in the active mode maintains the awake state. In other words, the STA is kept to the state in which a normal operation such as frame transmission and reception or channel sensing may be performed.

The STA operating in the PS mode switches back and forth between the doze state and the awake state. The STA operating in the doze state uses the minimum power and does not receive a radio signal transmitted from the AP, including a data frame. Also, the STA operating in the doze state does not perform channel sensing.

Since the amount of power consumed is reduced while the STA operates as long as possible in the doze state, the operating time of the STA is increased. However, since frame transmission and reception is impossible in the doze state, the STA may not operate unconditionally for a long time. If the STA operating in the doze state has a frame to transmit to the AP, the STA may switch to the awake state and transmit the frame. However, if the AP has a frame to transmit to the STA operating in the doze state, the STA is unable to receive the frame and what is more, does not know the existence of a frame to receive. Therefore, the STA may need to perform an operation for detecting existence of a frame to be transmitted to itself and if exists, switching to the awake state according to a specific period to receive the frame. Accordingly, the AP may transmit the frame to the STA. The aforementioned operation will be described with reference to FIG. 2.

Figure 2:
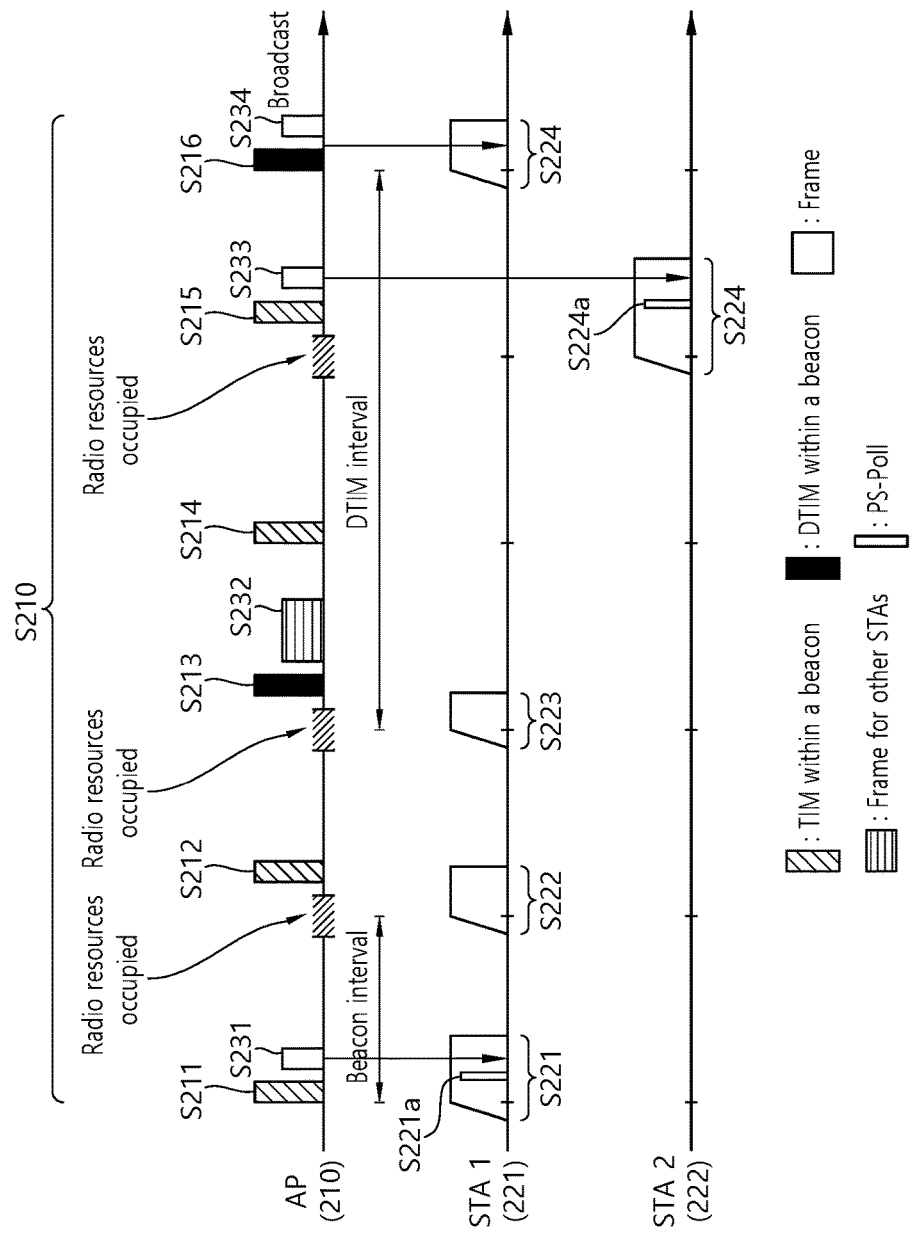
FIG. 2 illustrates one example of a response procedure of an AP according to the TIM protocol.

FIG. 2 illustrates one example of a response procedure of an AP according to the TIM protocol.

Referring to FIG. 2, the AP 210 transmit a beacon frame at regular intervals to the STAs within a BSS S210. The beacon frame includes a TIM (Traffic Indication Map) information element. The TIM element includes information informing that buffered traffic for the STAs associated with the AP 210 exists and frames are supposed to be transmitted. The TIM element has a TIM used for indicating a unicast frame and a DTIM (Delivery Traffic Indication Map) used for indicating a multicast or broadcast frame.

The AP 210 transmits a DTIM once every time three beacon frames are transmitted.

STA1 221 and STA2 222 are the STAs operating in the PS mode. The STA1 221 and STA2 222 may be configured so that they transition from the doze state to the awake state at wakeup intervals of a specific period to receive TIM elements transmitted by the AP 210.

A specific wakeup interval may be configured so that the STA1 221 may transition to the awake state at every beacon interval to receive the TIM element. Therefore, the STA1 221 switches to the awake state when the AP 210 transmits a beacon frame for the first time S221. The STA1 221 receives the beacon frame and obtains the TIM element. When the obtained TIM element indicates existence of a beacon frame to be transmitted to the STA1 221, the STA1 221 transmits a PS-poll frame requesting frame transmission to the AP 210, S221a. The AP 210 transmits a frame to the STA1 221 in response to the PS-poll frame S231. The STA1 221 which has completed frame reception transitions again to the doze state.

Since the medium is in a busy medium state such that another device has approached in the vicinity of the medium when the AP 210 attempts to transmit a second beacon frame, the AP 210 may not transmit the beacon frame at the precise beacon interval but transmit the beacon frame at a delayed time point S212. In this case, the STA1 221 switches the operating mode to the awake state according to the beacon interval but fails to receive the delayed beacon frame, thereby switching again to the doze state S222.

When the AP 210 transmits a third beacon frame, the corresponding beacon frame may include a TIM element configured for a DTIM. However, since the medium is in the busy medium state, the AP 210 delays transmission of the beacon frame S213. The STA1 221 switches to the awake state according to the beacon interval and may obtain the DTIM through the beacon frame transmitted by the AP 210. Since the DTIM obtained by the STA1 221 indicates that frames are to be transmitted to other STAs rather than the STA1 221, the STA1 221 switches back to the doze state. After transmission of the beacon frame, the AP 210 transmits a frame to the corresponding STA S232.

The AP 210 transmits a fourth beacon frame S214. However, since the STA1 221 was unable to obtain the information indicating existence of buffered traffic directed to itself from the previous two times of TIM element reception, the STA1 221 may adjust the wakeup interval for TIM element reception. Similarly, when the beacon frame transmitted by the AP 210 includes signaling information for adjusting the wakeup interval of the STA1 221, the wakeup interval of the STA1 221 may be adjusted. In the present embodiment, the STA1 221 may be configured so that it switches its operating state once every three beacon intervals from the switching of the operating state every beacon interval for the reception of TIM elements. Therefore, since the STA1 221 is in the doze state when the AP 210 transmits the fifth beacon frame S215 after transmitting the fourth beacon frame S214, the corresponding TIM element may not be obtained.

When the AP 210 transmits a sixth beacon frame S216, the STA1 221 switches to the awake state and obtains the TIM element included in the beacon frame S224. Since the TIM element is a DTIM indicating existence of a broadcast frame, the STA1 221, instead of transmitting a PS-poll frame to the AP 210, receives the broadcast frame transmitted by the AP 210, S234.

Meanwhile, the wakeup state of the STA2 222 may be configured so that it may have a longer period than the STA1 221. Therefore, the STA2 222 may switch to the awake state and receive the TIM element at the time the AP 210 transmits a fifth beacon frame S224. The STA2 222, knowing existence of a frame to be transmitted to itself through the TIM element, transmits a PS-poll frame to the AP 210 to request transmission S224a. The AP 210 transmits a frame to the STA2 222 in response to the PS-poll frame S233.

For the power save mode operation as shown in FIG. 2, a TIM element includes a TIM indicating existence of a frame to be transmitted to an STA or a DTIM indicating existence of a broadcast/multicast frame. A DTIM may be implemented by setting up the field of the TIM element.

A detailed response procedure of an STA which has received a TIM element may be described with reference to FIGS. 3 to 5 below.

Figure 3:
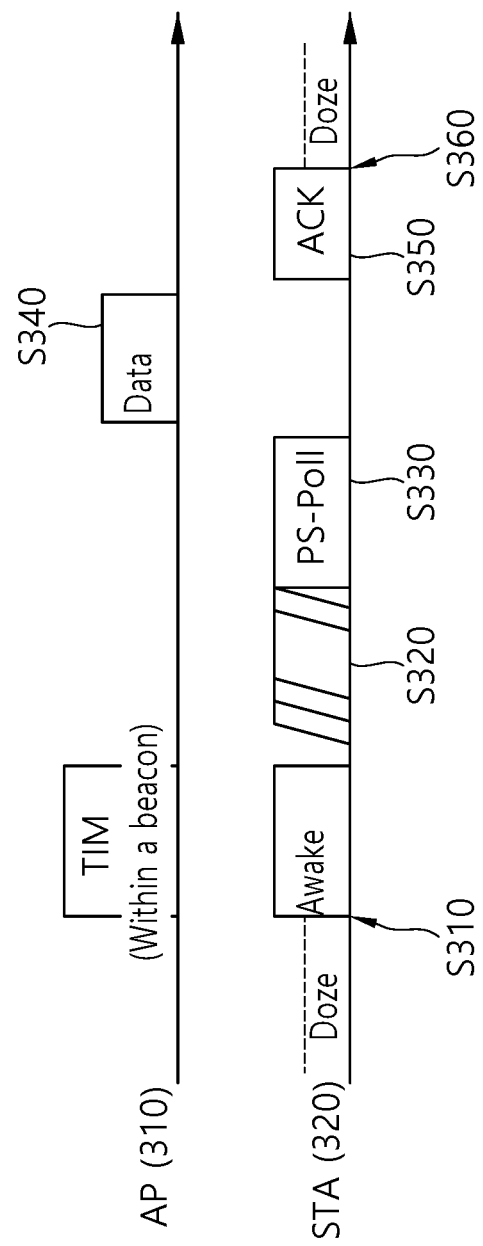
FIG. 3 illustrates one example of a response procedure of an AP according to the TIM protocol.

FIG. 3 illustrates one example of a response procedure of an AP according to the TIM protocol.

Referring to FIG. 3, the STA 320 switches its operating mode from the doze state to the awake state to receive a beacon frame including a TIM from the AP 310, S310. The STA 320 interprets the received TIM element and learns that there is buffered traffic to be transmitted to itself.

The STA 320 contends against other STAs to access the medium for transmission of a PS-poll frame S320 and transmits a PS-poll frame to request the AP 310 to transmit a data frame S330.

The AP 310 which has received the PS-poll frame transmitted by the STA 320 transmits a data frame to the STA 320. Receiving the data frame, the STA2 320 transmits an ACK (Acknowledgement) frame to the AP 310 in response to the reception S350. Afterwards, the STA2 320 switches the operating mode again to the doze mode S360.

As shown in FIG. 3, instead of making an immediate response in which the AP transmits a data frame immediately after receiving the PS-poll frame from the STA, the AP may transmit the data frame at some particular time point after the PS-poll frame is received.

In what follows, a NAN (Neighbor Awareness Networking) topology will be described.

Figure 4:
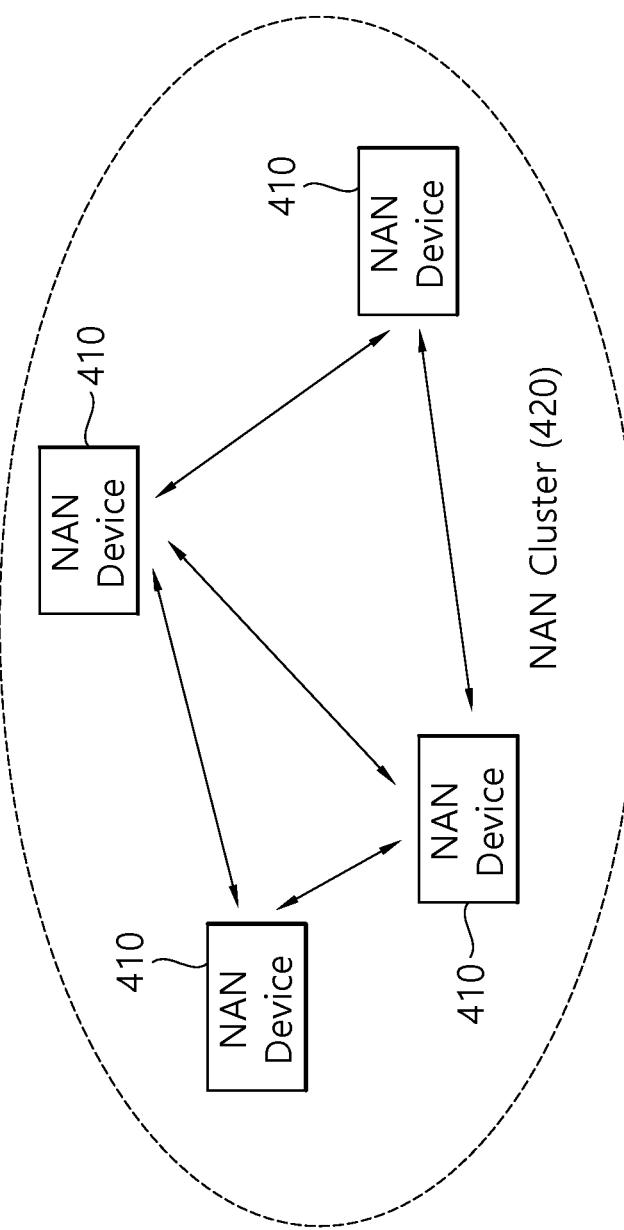

FIGS. 4 and 5 illustrate a NAN cluster.

A NAN network may comprise NAN devices using a set of the same NAN parameters. The NAN parameters may include an interval between consecutive discovery windows (DWs), beacon interval, and NAN channel.

As shown in FIG. 4, the NAN devices 410 may form a NAN cluster. Here, a NAN cluster 420 uses a set of the same NAN parameters. Also, the NAN cluster 420 refers to a set of NAN devices 410 synchronized to the same discovery window schedule. A NAN device 410 belonging to the NAN cluster 420 may transmit a multicast/unicast NAN service discovery frame (SDF) to other NAN devices 410 within the range of a discovery window.

As shown in FIG. 5, a NAN cluster 520 may have one or more NAN masters 510, and the NAN master 510 may be changed. Also, the NAN master 510 may transmit all of a synchronization beacon frame, discovery beacon frame, and NAN service discovery frame.

A synchronization beacon frame is used for synchronization of NAN devices within a NAN cluster. A discovery beacon frame is used for advertisement so that a NAN device not belonging to a NAN cluster may discover the NAN cluster. A service discovery frame is used for exchanging information about a service among NAN devices.

In what follows, described will be architecture of a NAN device.

Figure 6:
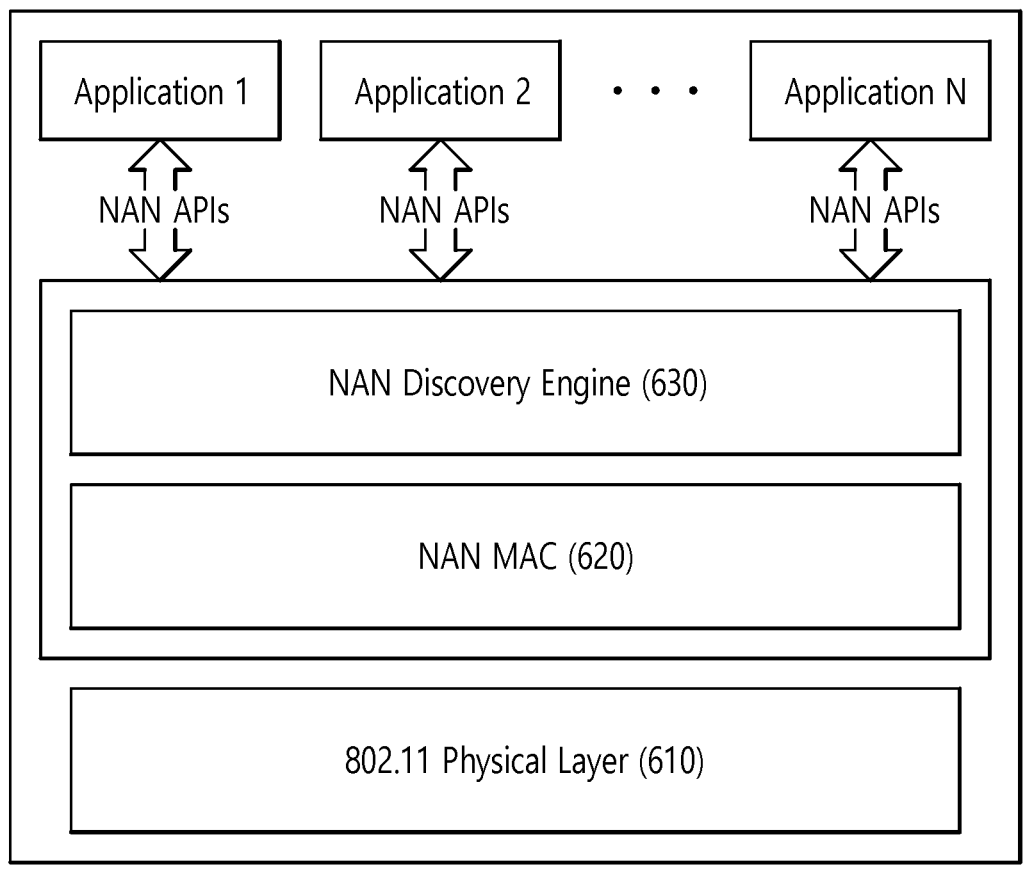
FIG. 6 illustrates the structure of a NAN device.

FIG. 6 illustrates the structure of a NAN device.

As shown in FIG. 6, a NAN device is based on the physical layer 610 of the IEEE 802.11 specification, the primary components of which include a NAN discovery engine 630, NAN MAC (Medium Access Control) 620, and NAN APIs for individual applications Application 1, Application 2, . . . , Application N.

Figure 7:
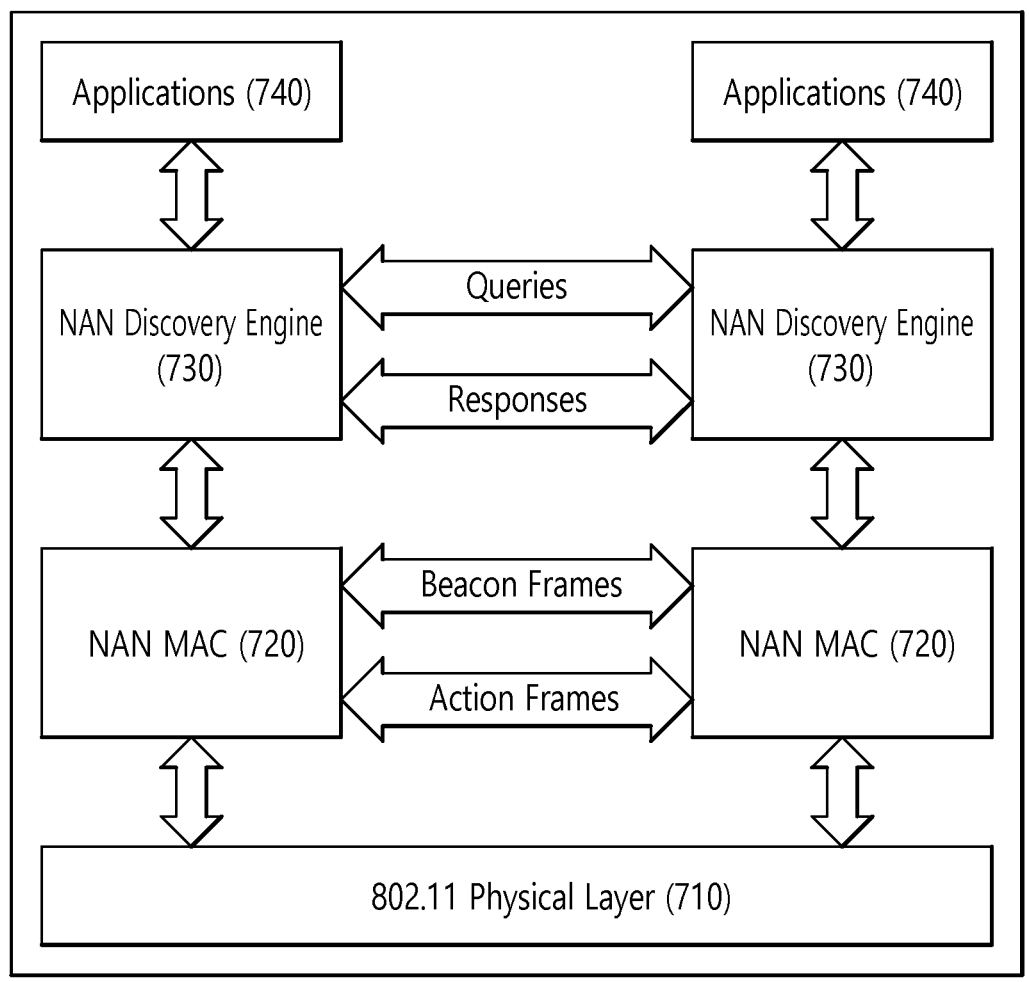
FIGS. 7 and 8 illustrate the relationship between NAN components.
Figure 8:
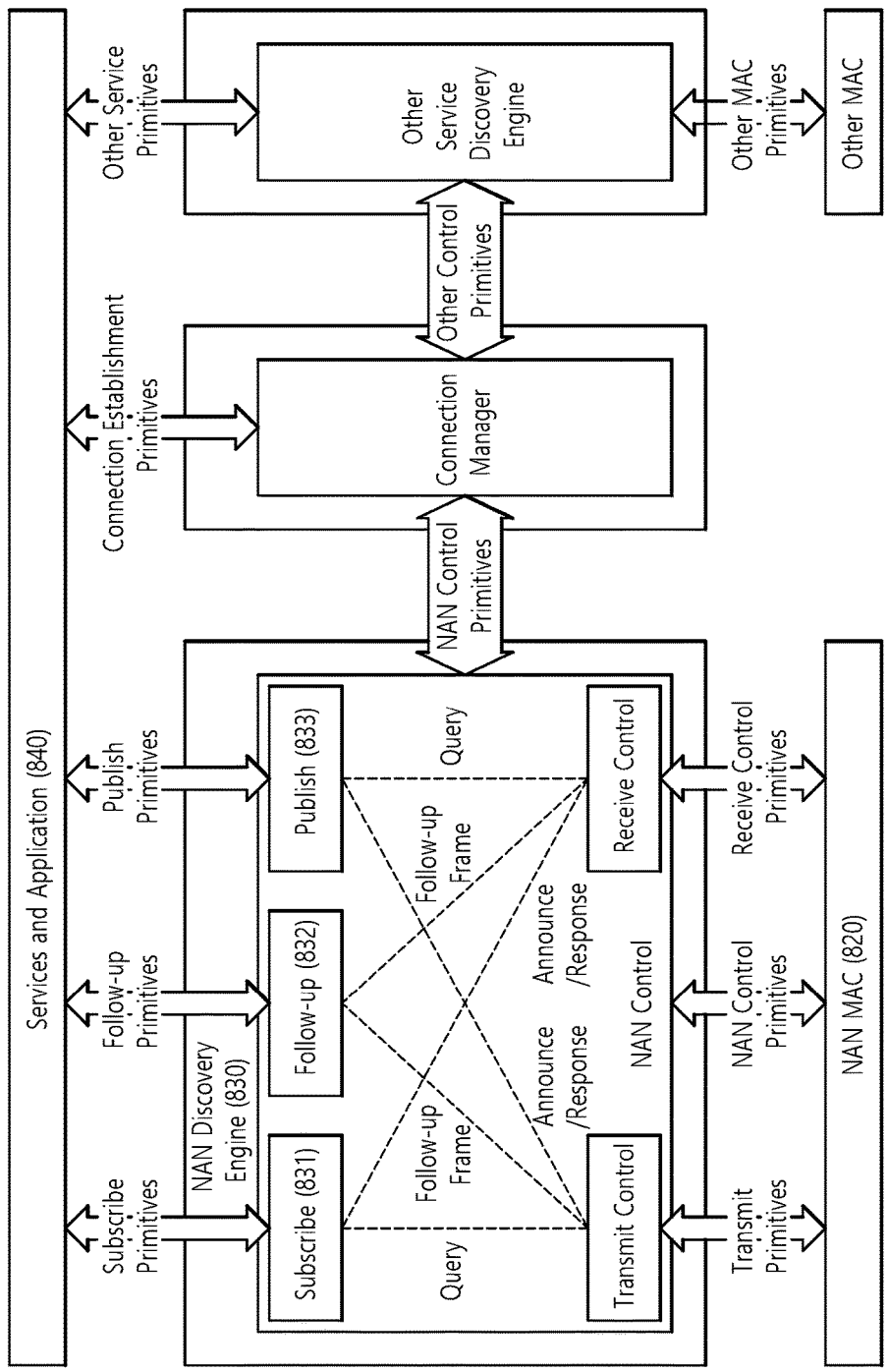

FIGS. 7 and 8 illustrate the relationship between NAN components.

Service queries and responses are handled by the NAN discovery engine 730, 830, and the NAN MAC 720, 820 processes NAN beacon frames and NAN service discovery frame. The NAN discovery engine 730, 830 may provide such functions as subscribe 831, publish 833, and follow-up 832. The publish/subscribe 831, 833 function operates through a service interface provided by a service/application 840. If the publish/subscribe 831, 833 command is executed, an instance with a publish/subscribe 831, 833 function is generated. Each instance is operated independently, and depending on implementations, several instances may be operated simultaneously. A follow-up function 832 is a means for a service/application 840 transmitting and receiving service-specific information.

In what follows, the roles and states of a NAN device will be described.

Figure 9:
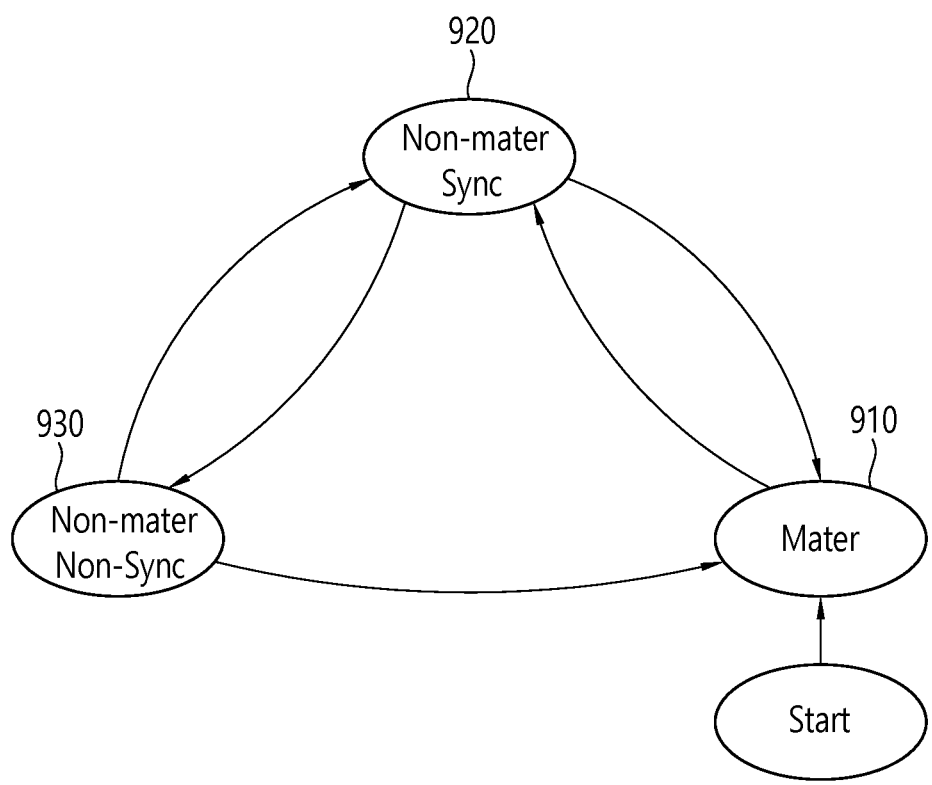
FIG. 9 illustrates state transition of a NAN device.

FIG. 9 illustrates state transition of a NAN device.

As described briefly above, a NAN device may perform the role of a master, which may also be changed. In other words, a NAN device may transition to one of various roles and states, the examples of which are shown in FIG. 9. The roles and states that may be assumed by the NAN device include a master (in what follows, the master indicates the master role and sync. state, 910), non-master sync 920, and non-master non-sync 930. According to the individual roles and states, whether to transmit the discovery beacon frame and/or synchronization beacon frame may be determined, which is summarized in Table 1.

TABLE 1

| Role and State | Discovery Beacon | Synchronization Beacon |
| --- | --- | --- |
| Master | Transmittable | Transmittable |
| Non-Master Sync | Non-transmittable | Transmittable |
| Non-Master Non-Sync | Non-transmittable | Non-transmittable |

The state of the NAN device may be determined through a master rank (MR). The master rank represents the intent of a NAN device to act as a NAN master. In other words, a large master rank indicates a high preference to a NAN master. The NAN MR may be determined by Eq. 1 using the master preference, random factor, and device MAC address.

$$\text{MasterRank} = \text{MasterPreference} * 2^{56} + \text{RandomFactor} * 2^{48} + \text{MAC}[5] * 2^{40} + \ldots + \text{MAC}[0] \quad \text{[Eq. 1]}$$

The master preference, random factor, and device MAC address may be indicated by the master indication attribute included in the NAN beacon frame. The master indication attribute may be defined as shown in Table 2 below.

TABLE 2

| Field Name | Octets | Value | Description |
| --- | --- | --- | --- |
| Attribute ID | 1 | 0x00 | identifies the type of NAN attribute |
| Length | 2 | 2 | Length of the following field in the attribute |
| Master Preference | 1 | 0-255 | Information that is used to indicate a NAN Devices preference to serve as the role of Master, with a larger value indicating a higher preference. |
| Random Factor | 1 | 0-255 | A random number selected by the sending NAN Device |

With respect to the MR, a NAN device which activates a NAN service and starts a NAN cluster sets the master preference and the random factor to zero; and resets the NANWarmUp. The NAN device has to set the master preference field value within the master indication attribute to a value larger than zero until the NANWarmUp is completed and set the random factor within the master indication attribute to a new value. A NAN device which has joined a NAN cluster in which the master preference of an anchor master is set to a value larger than zero may set the master preference to a value larger than zero irrespective of whether NANWarmUp is completed or not and set the random factor to a new value.

Next, the NAN device may become an anchor master of a NAN cluster depending on the MR value. In other words, all of the NAN devices are capable of operating as an anchor master. An anchor master is such a device that has the largest MR in the NAN cluster, zero HO (Hop count to the Anchor master) value, and the smallest AMBTT (Anchor Master Beacon Transmit Time) value. Although two anchor masters may exist temporarily in the same NAN cluster, it is preferable to have only one anchor maser. The NAN device which has become the anchor master in the existing NAN cluster uses the TSF used in the existing NAN cluster.

A NAN device may become an anchor master if the following conditions are met: the NAN device starts a new NAN cluster, the master rank is changed (the MR values of other NAN devices are changed or the MR value of the anchor master itself is changed), or a beacon frame of a current anchor master is no longer received. Also, when the MR values of other NAN devices are changed or the MR value of the anchor master itself is changed, the NAN device may lose the position as the anchor master. The anchor master may be determined by the anchor master selection algorithm described below. In other words, anchor master selection determines which NAN device becomes the anchor master of a NAN cluster, where each NAN device activates the anchor master selection algorithm when it joins the NAN cluster.

When a NAN device starts a new NAN cluster, the NAN device becomes the anchor master of the new NAN cluster. A NAN synchronization beacon frame having a hop counter exceeding a threshold is not used by the NAN device. Other NAN synchronization beacon frames the hop counter of which does not exceed the threshold are used to determine the anchor master of the NAN cluster.

Receiving a NAN synchronization beacon frame the hop counter of which does not exceed the threshold, the NAN device compares a stored anchor master rank value with the anchor master rank value within the beacon frame. If the stored anchor master rank value is larger than the anchor master rank value within the beacon frame, the NAN device discards the anchor master rank value within the beacon frame. If the stored anchor master rank value is smaller than the anchor master rank value within the beacon frame, the NAN device newly stores the anchor master rank value within the beacon frame and the hop counter value each incremented by one; and AMBTT value within the beacon frame. Also, if the stored anchor master rank value is the same as the anchor master value within the beacon frame, the NAN device compares the stored anchor master rank value with the hop counter. If the hop counter value of the beacon frame is larger than the stored value, the NAN device ignores the received beacon frame. When the hop counter value of the beacon frame (stored value 1) is the same as the stored value, but the AMBTT value is larger than the stored value, the NAN device newly stores the AMBTT value of the beacon frame. If the hop counter value of the beacon frame (stored value 1) is smaller than the stored value, the NAN device increases the hop counter value of the beacon frame by 1. The stored AMBTT value is updated according to the following rule. When the received beacon frame is received from a NAN master or a device rather than the master sync, the AMBTT value is set to the value included in the NAN cluster attribute of the received beacon.

Meanwhile, if the TSF timer of the NAN device exceeds the stored AMBTT value more than 16*512 TUs (for example, 16 DS periods), the NAN device may regard itself as the anchor master and update an anchor master record. Also, when there is a change in any of the elements belonging to the MR (master preference, random factor, and MAC address), NAN devices other than the anchor master compare the changed MR values with their stored values. When the changed MR value of the NAN device is larger than the stored value, the NAN device may regard itself as the anchor master and update the anchor master record.

Also, except for the case in which the anchor master sets the AMBTT value to the TSF value for the corresponding beacon transmission, the NAN device may set the NAN synchronization and anchor master field of the cluster attribute within the discovery beacon frame to the value contained in the anchor master record. A NAN device which transmits the NAN synchronization or discovery beacon frame may guarantee that the TSF value of a beacon frame is derived from the same anchor master included in the cluster attribute.

Also, 1) when a NAN beacon indicates a value larger than the anchor master record of the NAN device; or 2) when the NAN beacon indicates an anchor master rank having the same value as the anchor master record of the NAN device, and the hop counter value and AMBTT value of the NAN beacon frame indicate a value larger than the anchor master record, the NAN device may apply the TSF timer value within the NAN beacon received by using the same cluster ID.

In what follows, NAN synchronization will be described.

NAN devices participating in the same NAN cluster may be synchronized by a common clock. The TSF of a NAN cluster may be implemented by a distributed algorithm which has to be executed in all of the NAN devices. Each NAN device participating in the NAN cluster may transmit NAN synchronization beacon frames according to the algorithm. Each device may synchronize its clock during a discovery window (DW). The length of a DW is 16 TUs. During the DW, one or more NAN devices may transmit synchronization beacon frames to help all of the other NAN devices synchronized to the clock of the former NAN devices.

Transmission of NAN beacons is performed in a distributed manner. Transmission time of a NAN beacon frame is the DW interval defined every 512 TUs. All of the NAN devices may participate in generation and transmission of NAN beacons depending on the roles and status of the respective devices. Each NAN device has to maintain its own TSF timer used for NAN beacon period timing. The NAN synchronization beacon interval may be established by the NAN device generating a NAN cluster. A series of TBTTs are defined so that DW intervals in which synchronization beacon frames are transmitted may be set apart precisely by 512 TUs. The 0 time is defined as a first TBTT, and a discovery window starts from each TBTT.

Each NAN device which performs the role of a master transmits NAN discovery beacon frames outside the NAN discovery window. On average, a NAN device functioning as a master transmits a NAN discovery beacon every 100 TUs. The time interval between consecutive NAN discovery beacons transmitted by the same NAN device is less than 200 TUs. If scheduled transmission time overlaps the NAN discovery window of the NAN cluster in which NAN devices participate, the NAN device performing the master role may omit transmission of NAN discovery beacons. To minimize power for transmission of NAN discovery beacon frames, the NAN device performing the master role may use AC_VO (WMM Access Category—Voice) contention setting.

Figure 10:
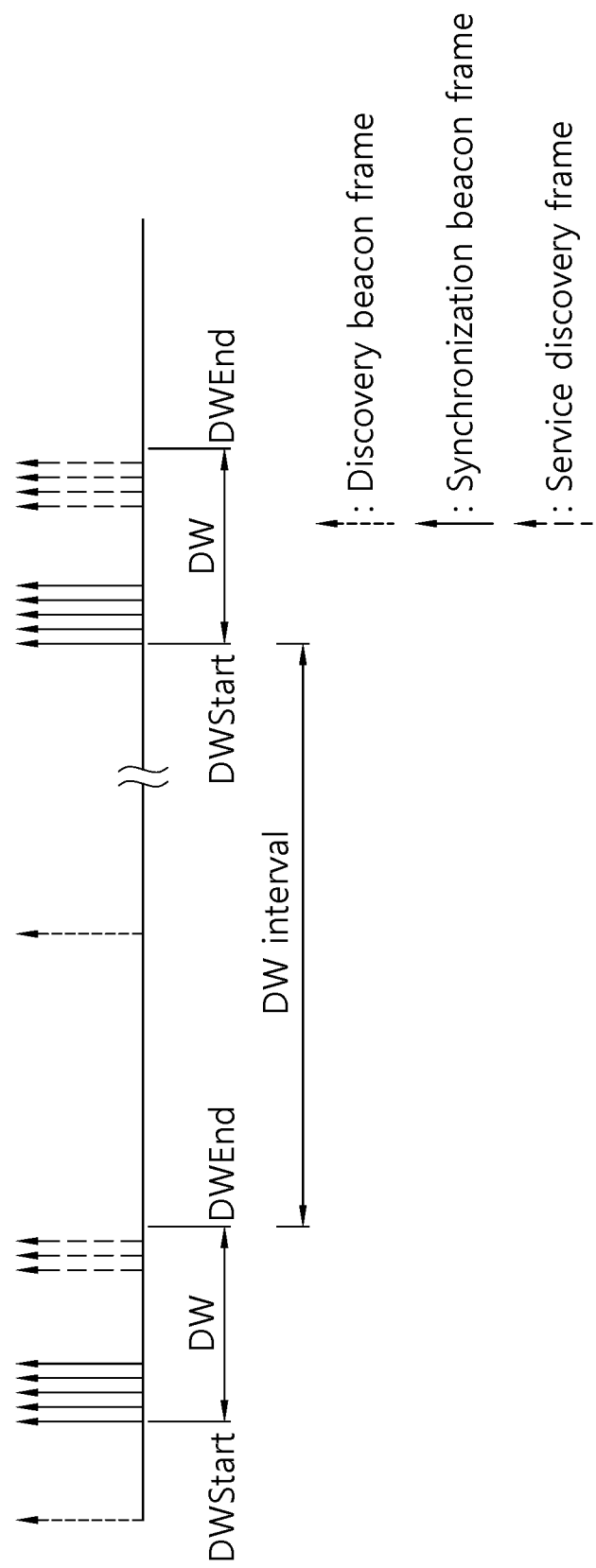
FIG. 10 illustrates the operation in a discovery window.

FIG. 10 illustrates the operation in a discovery window.

A discovery window (DW) may be regarded as the time or channel to which NAN devices converge.

During a discovery window, one or more NAN devices transmit a synchronization beacon frame, by which all of the NAN devices within a NAN cluster may be synchronized. One NAN device may transmit one synchronization beacon frame during one discovery window.

Between the discovery windows, one or more NAN devices transmit discovery beacon frames so that NAN devices may discover the NAN cluster.

During the discovery window, NAN devices may transmit contention-based service discovery frames. A NAN device initiates a backoff timer set to an arbitrary value and transmits a service discovery frame when the value of the backoff timer becomes zero.

The present invention proposes a method for performing paging between NAN devices and receiving data according to the paging. In what follows, a NAN device receiving the data is assumed to be a subject of operation. However, the present invention is not limited to the aforementioned assumption, and a NAN device transmitting data may also be the subject of operation.

Figure 11:
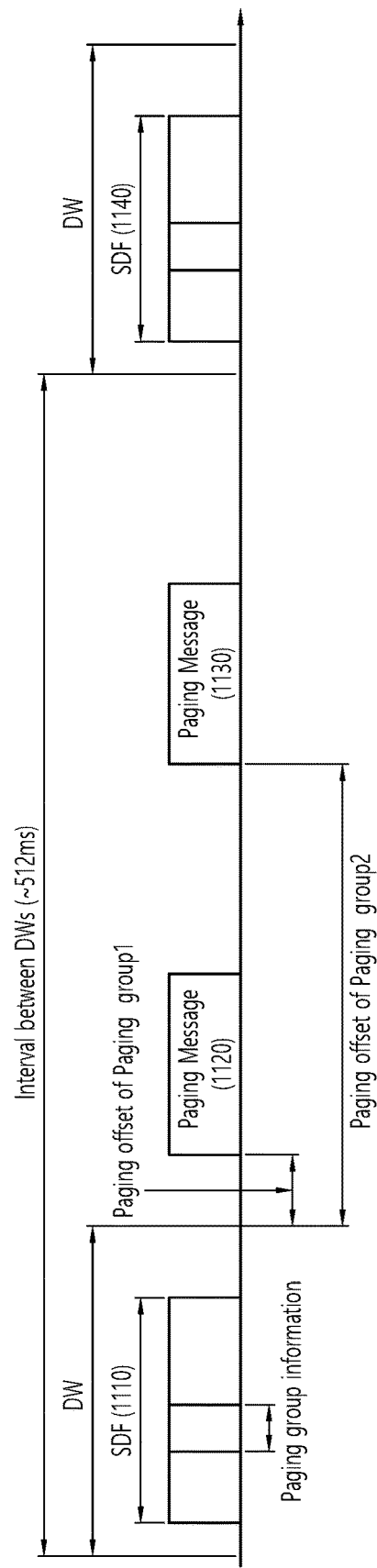
FIG. 11 illustrates a basic NAN paging architecture.

FIG. 11 illustrates a basic NAN paging architecture.

As shown in FIG. 11, a NAN device first transmits and receives a service discovery frame (SDF) 1110 during a discovery window (DW). A receiving NAN device receives the service discovery frame 1110 during the discovery window. At this time, the service discovery frame includes paging group information. The paging group information includes a cluster ID, paging group ID, multi-channel information, paging offset, and the number of NAN devices within a paging group. The paging group information is described in more detail in Table 3 below.

When receiving paging group information included in the service discovery frame 1110, the NAN device may obtain information about when a paging message that the NAN device has to read is transmitted. More specifically, during the discovery window interval, the NAN device checks whether the paging group ID of the NAN device is included in the paging group IDs within the paging group information.

If it is determined that the paging group ID of the NAN device is included in the paging group IDs within the paging group information, it may be considered that the NAN device is aware of the time its paging message is transmitted. Therefore, the NAN device may switch to the doze state until its paging message is transmitted, thereby reducing power consumption. At this time, the time the paging message of the NAN device is transmitted may be known from the paging offset, the doze state continues until the paging offset is ended after the discovery window. Also, referring to FIG. 11, since paging offsets are different for the respective paging groups, NAN devices receive paging messages 1120, 1130 for each paging group. In other words, the paging message 1120 of the paging group 1 is received after the paging offset of the paging group 1, and the paging message 1130 of the paging group 2 is received after the paging offset of the paging group 2. Thus, according to the embodiment described above, since PS-poll frames are transmitted with paging messages being distributed according to their paging group IDs, an advantageous effect of reducing contention may be achieved.

Also, if it is confirmed that the paging group ID of the NAN device is not found in the paging group IDs within the paging group information, the NAN device switches to the doze state in the whole interval between DWs of FIG. 11, 512 ms except for the discovery window interval (16 ms). And the NAN device transitions to the awake state at the start of the next discovery window interval, receives a service discovery frame 1140, and checks from the service discovery frame whether the paging group ID of the NAN device is included in the paging group IDs within the paging group information. In other words, if the paging group ID of the NAN device is not found in the service discovery frame, it means that a paging message is not transmitted since there is no data to be transmitted to the NAN device within the interval between DWs, 512 ms. Therefore, by including the paging group ID and paging offset information according to the present invention in the service discovery frame, power consumption of a NAN device may be reduced. In addition, contention due to transmission of PS-poll frames may be reduced.

Figure 12:
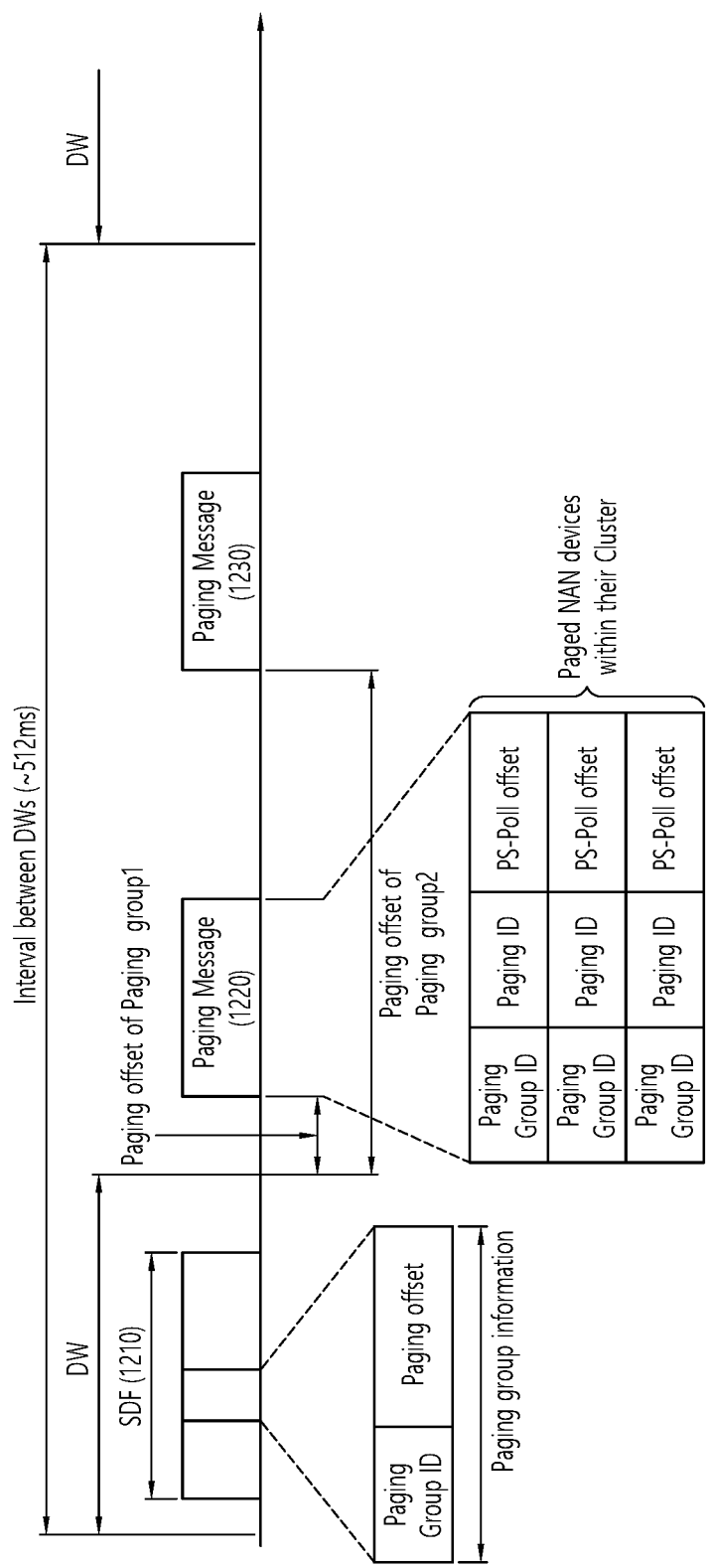
FIG. 12 illustrates one example of parameters included in the paging group information and paging message.

FIG. 12 illustrates one example of parameters included in the paging group information and paging message.

In the same way as FIG. 11, a receiving NAN device receives a service discovery frame 1210 during a discovery window. At this time, the service discovery frame 1210 includes paging group information. The paging group information includes a cluster ID, paging group ID, multi-channel information, and the number of NAN devices within a paging offset paging group as shown in Table 3 below.

TABLE 3

| Parameter | Description |
| --- | --- |
| Cluster ID | NAN cluster ID to which the corresponding paging group belongs |
| Paging group ID | Identifier for identifying a group of NAN devices capable of receiving a paging message (or a message including Traffic Indication Map) at the same time point by applying the same paging offset |

TABLE 3-continued

| Parameter | Description |
|---|---|
| | In general, a paging group may be defined as a sub-NAN cluster obtained by dividing a NAN cluster into a multiple sub-groups. In other words, one NAN cluster may be defined as a combination of multiple paging groups. In other case, a paging group may be the same group as a conventional NAN cluster. At this time, a paging group ID may be used as a NAN cluster ID. Also, a new paging group may be defined. |
| Multi-channel information | If a NAN device transmitting data supports multi-channel operation, and a paging message is transmitted from a different channel rather than the listen channel which transmits and receives a current service discovery frame, information of the different channel is informed. At this time, the NAN device applies a paging offset to the channel indicated by the information. In other words, the NAN device switches to the multi-channel indicated by the paging offset after the discovery window of the current listen channel is completed and receives a paging message. As described below, multi-channel information may include two types of information. (1) Frequency band information 0: 2.4 GHz 1: 5 GHz (2) Channel information value: contains the number of a channel to which the NAN device switches 0: indicates that the current listen channel transmits a paging message |
| Paging offset | Information about the time NAN devices belonging to the same paging group receive a paging message. The start time to which a paging offset is applied may use the time point at which a service discovery frame including paging group information is received. In other words, the NAN device receives a service discovery frame within a discovery window. Therefore, when the paging group ID of the NAN device is found in the service discovery frame, the NAN device switches to the doze state when the discovery window is completed and stays in that state until the paging offset is completed. After the paging offset, the NAN device receive a paging message. By doing so, power consumption during the paging offset may be reduce. |
| The number of NAN devices within a paging group | Represents the number of NAN devices included in a paging group |

Also, the paging message 1220, 1230 includes a cluster ID, paging group ID, paging ID (or TIM ID), multi-channel information, and PS-poll offset. Table 4 below describes the information included in the paging message 1220, 1230 in more detail.

TABLE 4

| Parameter | Description |
|---|---|
| Cluster ID | NAN cluster ID to which the corresponding paging group belongs |
| Paging group ID | Identifier for identifying a group of NAN devices capable of receiving a paging message (or a message including Traffic Indication Map) at the same time point by applying the same paging offset. In general, a paging group may be defined as a sub-NAN cluster obtained by dividing a NAN cluster into a multiple sub-groups. In other words, one NAN cluster may be defined as a combination of multiple paging groups. In other case, a paging group may be the same group as a conventional NAN cluster. At this time, a paging group ID may be used as a NAN cluster ID. Also, a new paging group may be defined. |
| Paging ID (or TIM ID) | Identifier for indicating a NAN device which has data to receive in a paging message (or a message including a TIM element) For example, NAN MAC address, HASH value (NAN MAC address), or newly defined paging ID (TIM ID) |
| Multi-channel information (If multi-channel information is included in the paging group information of a service discovery frame, the paging message does not include the multi-channel information.) | If a NAN device transmitting data supports multi-channel operation, data are transmitted from a different channel rather than the listen channel which transmits and receives a current service discovery frame, and a paging message is transmitted from the current listen channel which transmits and receives a service discovery frame, the paging message may provide information of a channel through which the paging message may be received, and a PS-poll frame may be transmitted. In this case, the NAN device applies the PS-poll offset to the channel indicated by the information. In other words, the NAN device may switch to the multi-channel indicated by the PS-poll offset after the discovery window of the current listen channel is completed and transmit a PS-poll frame. Afterwards, the NAN device receives data from the channel to which the NAN device has switched. In another method, the NAN device may transmit a PS-poll frame to the current listen channel, receives an ACK, and receive data from the indicated multi-channel. As described below, multi-channel information may include two types of information. (1) Frequency band information 0: 2.4 GHz 1: 5 GHz (2) Channel information value: contains the number of a channel to which the NAN device switches 0: indicates that the current listen channel transmits a PS-poll frame |
| PS-poll offset | Time information applied by a NAN device to transmit a PS-poll frame. A NAN device receives a paging message, and if the paging ID of the NAN device is included, the NAN device transmits a PS-poll frame after the PS-poll offset from the time the NAN device receives the paging message to the NAN device which has transmitted the paging message. |

Figure 13:
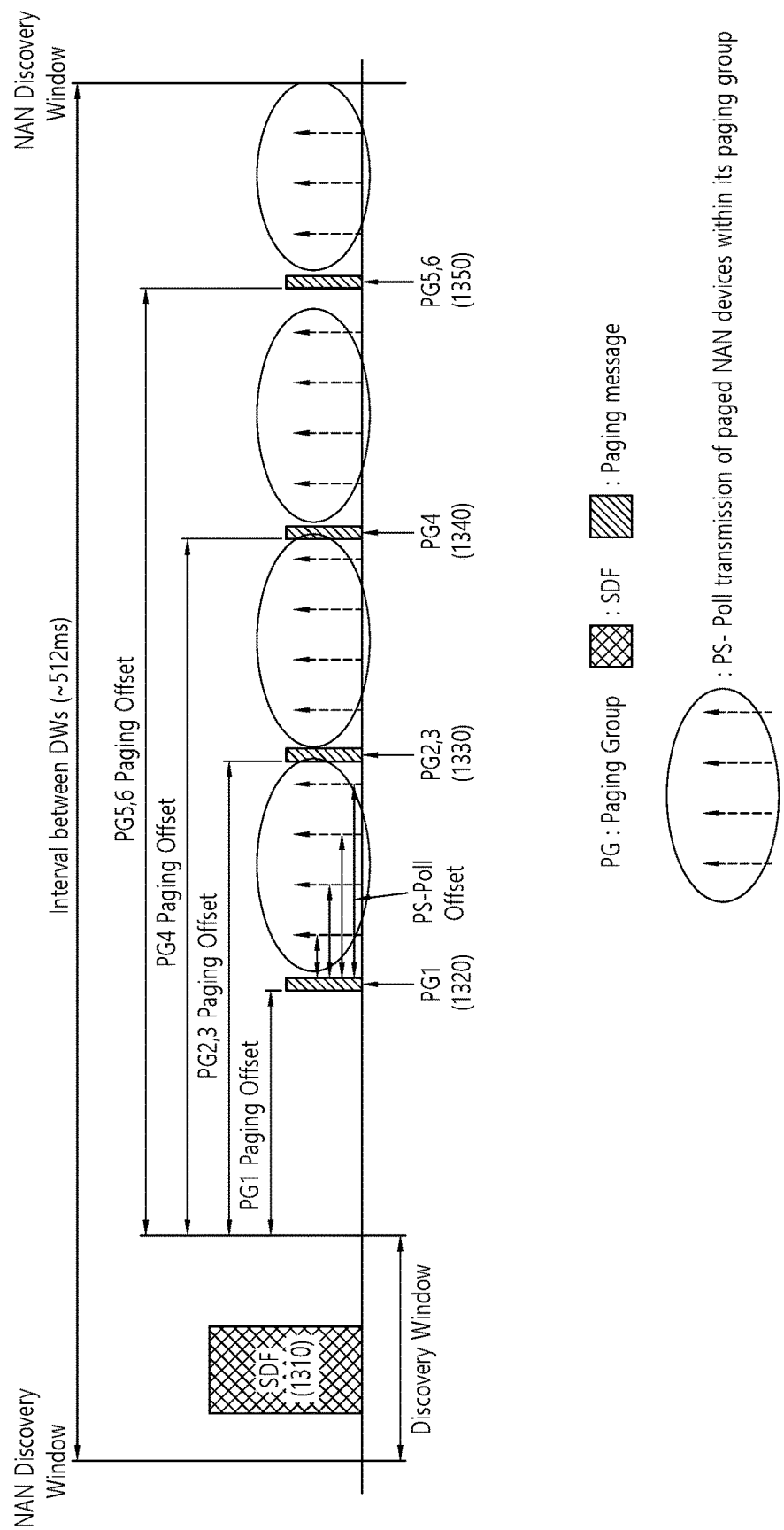
FIG. 13 illustrates one example of an operation for receiving paging messages and transmitting PS-poll frames.

FIG. 13 illustrates one example of an operation for receiving paging messages and transmitting PS-poll frames.

As shown in FIG. 13, a NAN device receives a service discovery frame 1310 including paging group information in a discovery window. The paging group information is described in detail in Table 3 above. If the paging group ID of the NAN device is found to be included in the service discovery frame, the NAN device stays in the doze state from the time the discovery window is completed until the paging offset included in the paging group information of the NAN device, after which the NAN device wakes up to receive paging messages 1320, 1330, 1340, 1350. Different paging offsets are used for the respective paging groups. Therefore, the paging message 1320 of the paging group 1 (PG 1) is received after the paging offset of the paging group 1, the paging message 1330 of the paging group 2, 3 (PG 2, 3) is received after the paging offset of the paging group 2, 3, the paging message 1340 of the paging group 4 (PG 4) is received after the paging offset of the paging group 4, the paging message 1350 of the paging group 5, 6 (PG 5, 6) is received after the paging offset of the paging group 5, 6. A paging message includes a paging ID and a PS-poll offset as described in detail in Table 4 above. If paging IDs of the NAN devices are found in the paging message, individual NAN devices transmit the PS-poll frames in a contention-based manner according to the PS-poll offsets included in the paging message (after the PS-poll offsets). In other words, a receiving NAN device the PS-poll frame to the NAN device which has transmitted the paging message. And the receiving NAN device receives data from the NAN device which has transmitted the paging message.

Individual NAN devices belonging to the paging group have the respective PS-poll offsets and transmit PS-poll frames at different time points. For example, suppose a first NAN device, second NAN device, third NAN device, fourth NAN device, and fifth NAN device belong to the paging group 1 (PG 1). The NAN devices belonging to the paging group 1, confirming that their paging group ID is included, receive the paging message 1320 after the paging offset of the paging group 1. The NAN device belonging to the paging group 1 checks whether the paging ID of the NAN device is included in the paging IDs included in the paging message 1320. At this time, it is assumed that the paging IDs of the first, second, third, and fourth NAN device are included, but the paging ID of the fifth NAN device is not included. Since the paging ID and the PS-poll offset are the parameters for the individual NAN devices, PS-poll offsets are set differently for the respective NAN devices. In other words, the first, second, third, and fourth NAN device may transmit PS-poll frames at different times according to their PS-poll offsets. Therefore, the present embodiment provides an advantageous effect of reducing contention due to transmission of PS-poll frames.

The embodiment of a method for performing paging in the WLAN system is described in detail below.

First of all, a preset discovery window (DW) may correspond to a discovery window set within an interval between current DWs. A receiving station may correspond to a NAN device to which an embodiment of the present invention is applied.

During a preset discovery window, a receiving station receives a paging group information message including a paging group ID and a paging offset. The paging group ID indicates at least one receiving station receiving a paging message. The paging offset indicates transmission time of a paging message. In other words, at least one receiving station may correspond to a group of NAN devices capable of receiving a paging message at the same time by applying the same paging offset. The paging group information message may be received by being included in a service discovery frame.

A receiving station receives a paging message according to the paging offset of the received paging group information message. A paging message includes a paging ID and PS-poll offset. The paging message indicates a receiving station transmitting a PS-poll frame. In other words, a paging ID is included in the paging message if there exists buffered traffic for the receiving station. The PS-poll offset indicates transmission time of a PS-poll frame.

A receiving station transmits a PS-poll frame at the transmission time indicated by the PS-poll offset. The receiving station may receive data after receiving an ACK with respect to the PS-poll frame. By doing so, a network connection among the NAN devices is performed.

Figure 14:
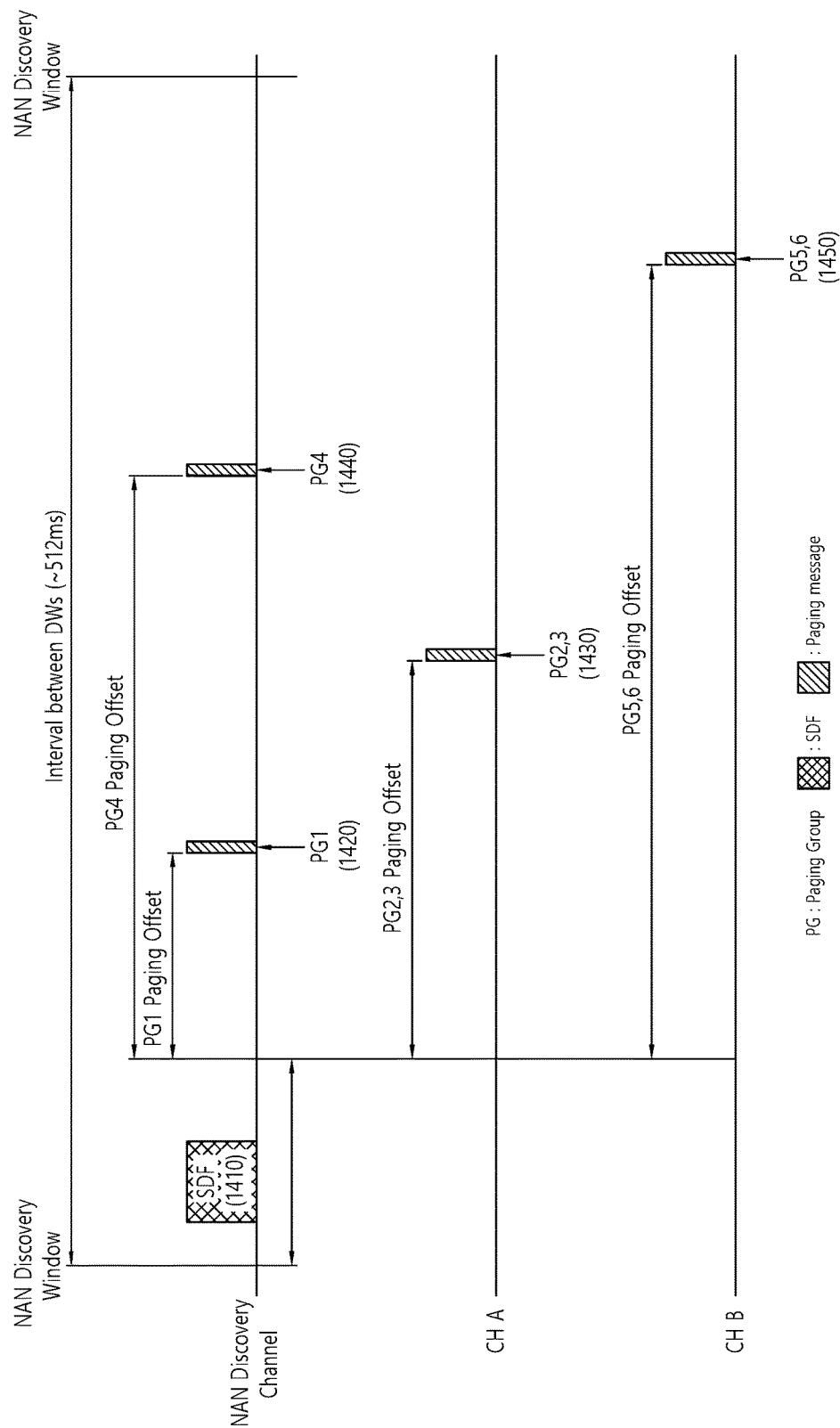
FIG. 14 illustrates one example of an operation for receiving paging messages and transmitting PS-poll frames in a multi-channel environment.

FIG. 14 illustrates one example of an operation for receiving paging messages and transmitting PS-poll frames in a multi-channel environment.

FIG. 14 illustrates one example of receiving a paging message by extending the embodiment of FIG. 13 to the case of using a multi-channel. More specifically, FIG. 14 illustrates one example in which a NAN device receives a paging message from a different channel rather than the listen channel currently receiving a service discovery frame when the NAN device receiving data supports the multi-channel operation.

First, the NAN device receives a service discovery frame 1410 including the paging group information in the discovery window. The paging group information is described in detail in Table 3 above. If the NAN device confirms that its paging group ID is included in the service discovery frame, the NAN device checks the multi-channel information and paging offset included in the paging group information. And the NAN device stays in the doze state from the time the discovery window is completed until the paging offset, awakes after the paging offset, performs channel switching through the channel indicated by the multi-channel information, and receives the paging messages 1420, 1430, 1440, 1450. When the channel value indicated by the multi-channel information is set to 0, the NAN device receives the paging messages 1420, 1430, 1440, 1450 from the listen channel currently receiving the service discovery frame 1410.

To describe the embodiment of FIG. 14, the paging message 1420 of the paging group 1 (PG 1) is received after the paging offset of the paging group 1 from the listen channel. In other words, the channel value indicated by the multi-channel information is 0 for the case of the paging group 1 (PG 1). The paging message 1430 of the paging group 2, 3 (PG 2, 3) is received after the paging offset of the paging group 2, 3 from the listen channel and a different channel A. The paging message 1440 of the paging group 4 (PG 4) is received after the paging offset of the paging group 4 from the listen channel. In other words, the channel value indicated by the multi-channel information is 0 for the case of the paging group 4. The paging message 1450 of the paging group 5, 6 (PG 5, 6) is received after the paging offset of the paging group 5, 6 from the listen channel and a different channel B.

And the NAN device may transmit the PS-poll frame after the PS-poll offset from the channel through which each paging message has been received to the NAN device which has transmitted the paging message and receive data from the NAN device which has transmitted the paging message.

In other words, transmission of PS-poll frames may be distributed over different channels for each paging group.

Figure 15:
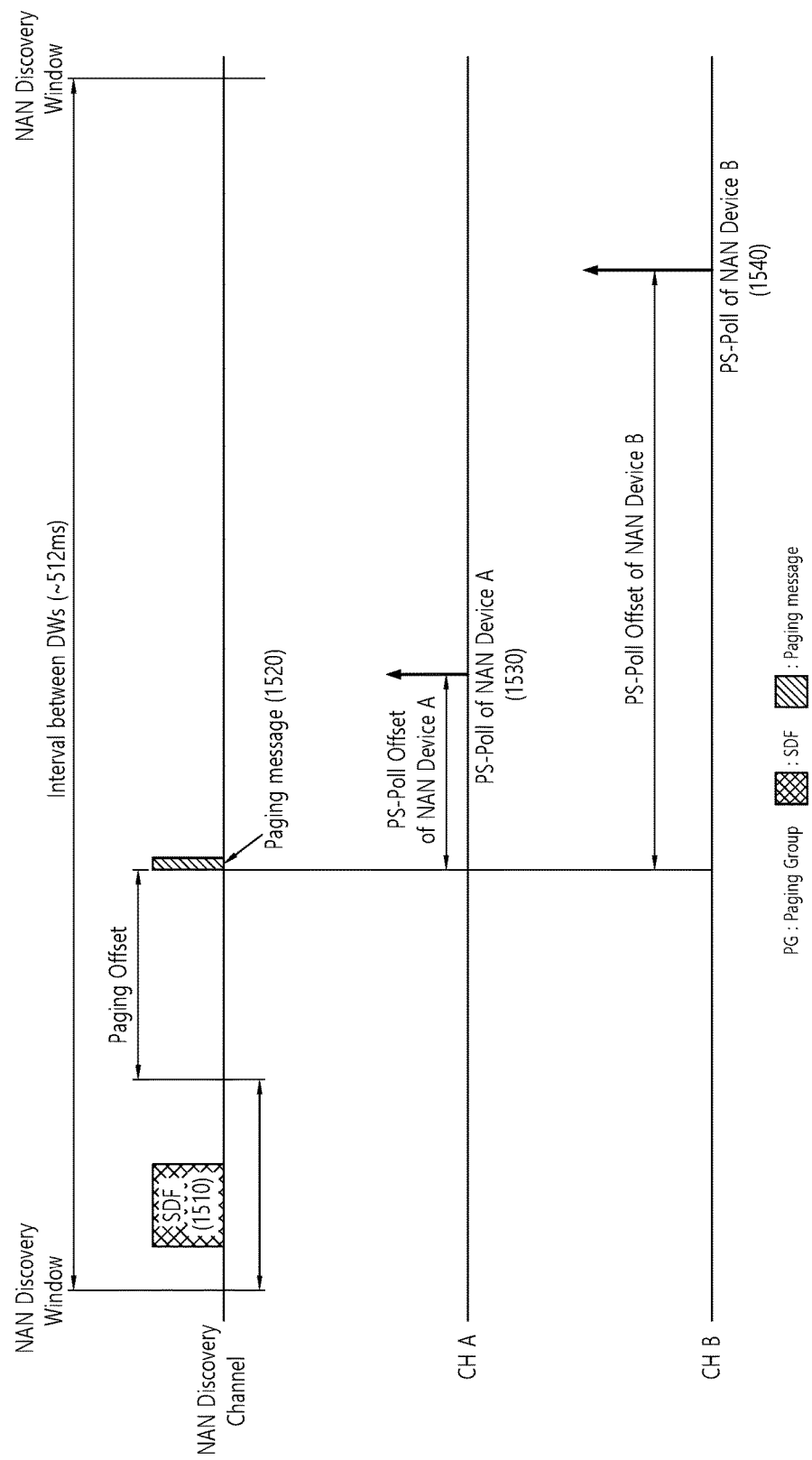
FIG. 15 illustrates another example of an operation for receiving paging messages and transmitting PS-poll frames in a multi-channel environment.

FIG. 15 illustrates another example of an operation for receiving paging messages and transmitting PS-poll frames in a multi-channel environment.

FIG. 15 is another embodiment in which a NAN device supporting multi-channel operation performs paging. Differently from FIG. 14, in the embodiment of FIG. 15, multi-channel information is transmitted by being included in a paging message rather than paging group information.

First, the NAN device receives a service discovery frame 1510 including the paging group information in the discovery window. The paging group information is described in detail in Table 3 above. If the NAN device confirms that its paging group ID is included in the service discovery frame, the NAN device stays in the doze state from the time the discovery window is completed until the paging offset, awakes after the paging offset, and receives the paging message 1520 from the listen channel which has received the service discovery frame. At this time, the paging message 1520 may inform of the information of a channel through which a PS-poll frame may be transmitted, along with multi-channel information. In this case, the NAN device may perform channel switching to the channel indicated by the multi-channel information, apply the PS-poll offset, and transmit the PS-poll frames. Afterwards, the NAN device receives data from the channel to which it has switched.

To describe the embodiment of FIG. 15, the paging message 1520 of a paging group is received from the listen channel after the paging offset of the paging group. Since the paging message 1520 includes multi-channel information and PS-poll offset, the PS-poll frame 1530 of the NAN device A is transmitted from the channel A indicated by the multi-channel information after the PS-poll offset for the case of the NAN device A. Also, for the case of the NAN device B, the PS-poll frame 1540 of the NAN device B is transmitted after the PS-poll offset from the channel B indicated by the multi-channel information.

In another embodiment, the NAN device may switch to the channel indicated by the multi-channel information after transmitting the PS-poll frame from the current listen channel and receiving an ACK and receive data from the channel to which the NAN device has switched.

A specific embodiment of a method for performing paging in a WLAN system supporting the multi-channel operation will be described below.

First of all, a preset discovery window (DW) may correspond to a discovery window set within an interval between current DWs. A receiving station may correspond to a NAN device to which an embodiment of the present invention is applied.

During a preset discovery window, a receiving station receives a paging group information message including a paging group ID and a paging offset. The paging group ID indicates at least one receiving station receiving a paging message. The paging offset indicates transmission time of a paging message. In other words, at least one receiving station may correspond to a group of NAN devices capable of receiving a paging message at the same time by applying the same paging offset. The paging group information message may be received by being included in a service discovery frame.

A receiving station receives a paging message according to the paging offset of the received paging group information message. A paging message includes a paging ID and PS-poll offset. The paging message indicates a receiving station transmitting a PS-poll frame. In other words, a paging ID is included in the paging message if there exists buffered traffic for the receiving station. The PS-poll offset indicates transmission time of a PS-poll frame.

A receiving station transmits a PS-poll frame at the transmission time indicated by the PS-poll offset. The receiving station may receive data after receiving an ACK with respect to the PS-poll frame. By doing so, a network connection among the NAN devices is performed.

If a NAN device supports a multi-channel operation, paging may be performed so that a paging message between NAN devices is extended to multiple channels. Here, a first channel may correspond to a listen channel receiving a paging group information message, and a second channel may correspond to a switched channel indicated by multi-channel information.

First, a paging group information message is received through a first channel. A multi-channel operation may be described by three embodiments. First, if a paging group information message further includes multi-channel information, a paging message is received through a second channel indicated by the multi-channel information according to a paging offset. In the same manner, a PS-poll frame is transmitted from the second channel indicated by the multi-channel information according to a PS-poll offset. At this time, the receiving station may receive ACK with respect to a PS-poll frame and data from the second channel.

Second, if a paging message is received through the first channel like the paging group information message, multi-channel information is further included in the paging message. At this time, only the PS-poll frame is transmitted from the second channel indicated by the multi-channel information according to the PS-poll offset. At this time, the receiving station may receive an ACK with respect to the PS-poll frame and data from the second channel.

Third, while the paging message further include multi-channel information, a receiving station may receive a paging group information message and a paging message from the first channel, transmit a PS-poll frame from the first channel and receive an ACK, and receive data from the second channel indicated by multi-path channel information.

Figure 16:
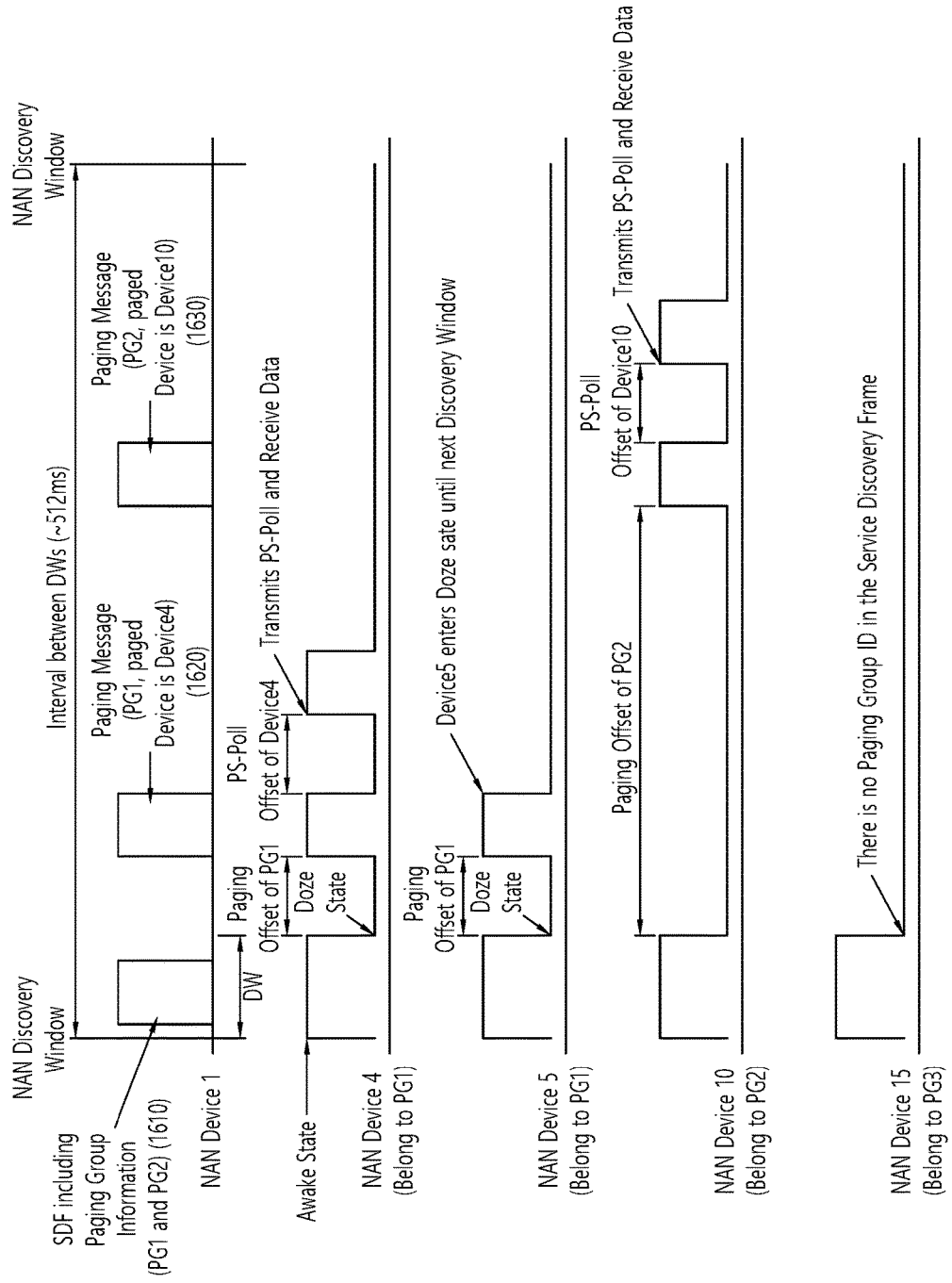
FIG. 16 illustrates one example of an operation for receiving paging messages and transmitting PS-poll frames with respect to a PS mode.

FIG. 16 illustrates one example of an operation for receiving paging messages and transmitting PS-poll frames with respect to a PS mode.

FIG. 16 illustrates an embodiment in which NAN device 1 transmits data to NAN device 4 belonging to paging group 1 (PG 1) and NAN device 10 belonging to paging group 2 (PG 2).

The NAN device 4 receives a service discovery frame 1610 in a discovery window and compares its paging group ID with the paging group ID included in the service discovery frame 1610. If it is confirmed that its paging group ID is included, the NAN device 4 switches to the doze state at the time the discovery window is completed and stays in that state until the paging offset of the paging group 1, thereby reducing power consumption. After the paging offset, the NAN device 4 switches to the awake state to receive a paging message 1620 transmitted to the NAN device 4. If the paging ID of the NAN device 4 is found in the paging message 1620, the NAN device 4 transmits a PS-poll frame to the NAN device 1 which has transmitted the paging message 1620 after the paging offset. At this time, the NAN device 4 switches to the doze state during the PS-poll offset to reduce power consumption. Afterwards, the NAN device 4 receives data from the NAN device 1. The NAN device 4 which has completed data reception switches again to the doze state before the next discovery window is initiated.

The NAN device 5, belonging to the paging group 1, confirms by checking the paging message 1620 that its paging ID is not included therein and switches to the doze state before the next discovery window is initiated.

The NAN device 10 confirms during the discovery window that the same ID as the paging group ID of the NAN device 10 is included in the service discovery frame 1510, switches to the doze state at the time the discovery window is completed, and stays in that state until the paging offset of the paging group 2, thereby reducing power consumption. After the paging offset, the NAN device 10 switches to the awake state to receive the paging message 1630 transmitted to the NAN device 10. If the paging ID of the NAN device 10 is found in the paging message 1630, the NAN device 10 transmits a PS-poll frame to the NAN device 1 which has transmitted the paging message 1630 after the paging offset. At this time, the NAN device 10 switches to the doze state during the PS-poll offset to reduce power consumption. Afterwards, the NAN device 10 receives data from the NAN device 1. The NAN device 10 which has completed data reception switches again to the doze state before the next discovery window is initiated.

The NAN device 15, confirming from the service discovery frame 1610 that the paging group ID of the NAN device 15 is not included, determines that there is no paging message to be transmitted within the current interval between DWs and switches to the doze state before the next discovery window is initiated, thereby reducing power consumption.

A specific embodiment of the method for performing paging in the WLAN system with respect to the PS mode will be described below.

First of all, a preset discovery window (DW) may correspond to a discovery window set within an interval between current DWs. A receiving station may correspond to a NAN device to which an embodiment of the present invention is applied.

During a preset discovery window, a receiving station receives a paging group information message including a paging group ID and a paging offset. The paging group ID indicates at least one receiving station receiving a paging message. The paging offset indicates transmission time of a paging message. In other words, at least one receiving station may correspond to a group of NAN devices capable of receiving a paging message at the same time by applying the same paging offset. The paging group information message may be received by being included in a service discovery frame.

A receiving station receives a paging message according to the paging offset of the received paging group information message. A paging message includes a paging ID and PS-poll offset. The paging message indicates a receiving station transmitting a PS-poll frame. In other words, a paging ID is included in the paging message if there exists buffered traffic for the receiving station. The PS-poll offset indicates transmission time of a PS-poll frame.

A receiving station transmits a PS-poll frame at the transmission time indicated by the PS-poll offset. The receiving station may receive data after receiving an ACK with respect to the PS-poll frame. By doing so, a network connection among the NAN devices is performed.

If a NAN device supports a multi-channel operation, paging may be performed so that a paging message between NAN devices is extended to multiple channels. Here, a first channel may correspond to a listen channel receiving a paging group information message, and a second channel may correspond to a switched channel indicated by multi-channel information.

First, a paging group information message is received through a first channel. A multi-channel operation may be described by three embodiments. First, if a paging group information message further includes multi-channel information, a paging message is received through a second channel indicated by the multi-channel information according to a paging offset. In the same manner, a PS-poll frame is transmitted from the second channel indicated by the multi-channel information according to a PS-poll offset. At this time, the receiving station may receive ACK with respect to a PS-poll frame and data from the second channel.

Second, if a paging message is received through the first channel like the paging group information message, multi-channel information is further included in the paging message. At this time, only the PS-poll frame is transmitted from the second channel indicated by the multi-channel information according to the PS-poll offset. At this time, the receiving station may receive an ACK with respect to the PS-poll frame and data from the second channel.

Third, while the paging message further include multi-channel information, a receiving station may receive a paging group information message and a paging message from the first channel, transmit a PS-poll frame from the first channel and receive an ACK, and receive data from the second channel indicated by multi-path channel information.

Here, the receiving station operates in a power save mode. Therefore, the receiving station, after being in a doze state, enters an awake state to receive a control signal during a preset window. Also, if a discovery window interval expires after the receiving station receives a paging group information message, the receiving station enters again the doze state again before receiving a paging message. In this regard, a paging offset indicates an interval between the time the discovery window interval expires and the time the receiving station receives a paging message.

Also, although the receiving station stays in the awake state when receiving a paging message, the receiving station again enters the doze state before transmitting a PS-poll frame after receiving the paging message. In this regard, the PS-poll offset indicates an interval between the time the receiving station receives the paging message and the time the receiving station transmits a PS-poll frame.

Figure 17:
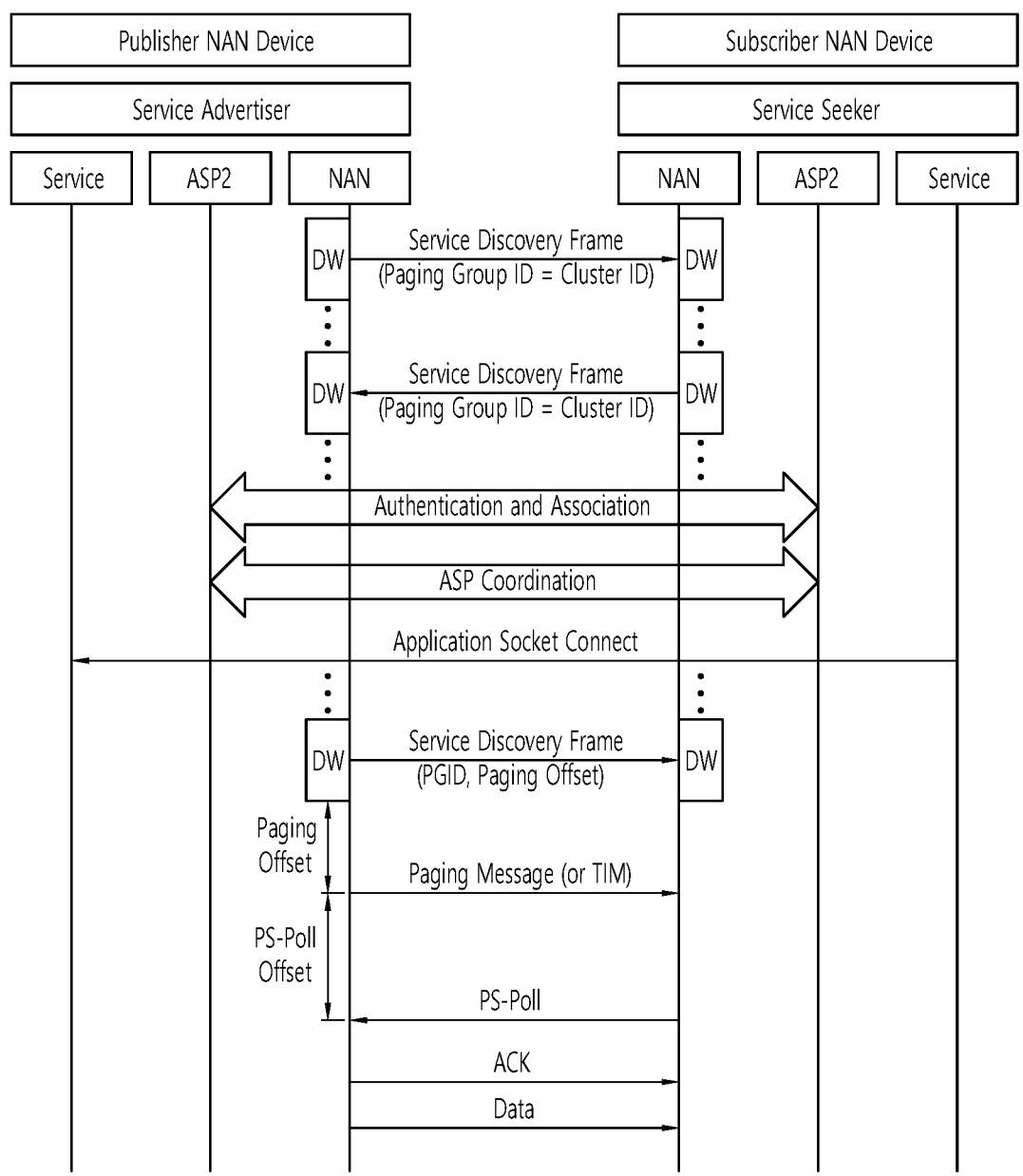
FIG. 17 illustrates one example of a paging operation and a data reception process among NAN devices.

FIG. 17 illustrates one example of a paging operation and a data reception process among NAN devices.

A paging group ID may be assigned in advance to a subscriber NAN device from a publisher NAN device which provides a service during the authentication and association process. In other words, a paging group ID may be assigned to an association response frame. The assigned paging group ID may be included in the service discovery frame, synchronization beacon, and discovery beacon frame.

After the authentication and association process, the NAN device receives a service discovery frame during a discovery window and obtains information about which NAN devices belonging to which paging group receive a paging message (namely paging group information). In other words, the NAN device receives paging group information including the paging group ID and paging offset from the service discovery frame.

If the paging group ID of the NAN device is found to be included, the NAN device checks a paging message after the paging offset. If the paging ID of the NAN device is found to be included in the paging message, the NAN device transmits a PS-poll frame to the NAN device which has transmitted the paging message after the PS-poll offset included in the paging message. Afterwards, the NAN device receives an ACK with respect to the PS-poll frame and data from the NAN device which has transmitted the paging message.

Figure 18:
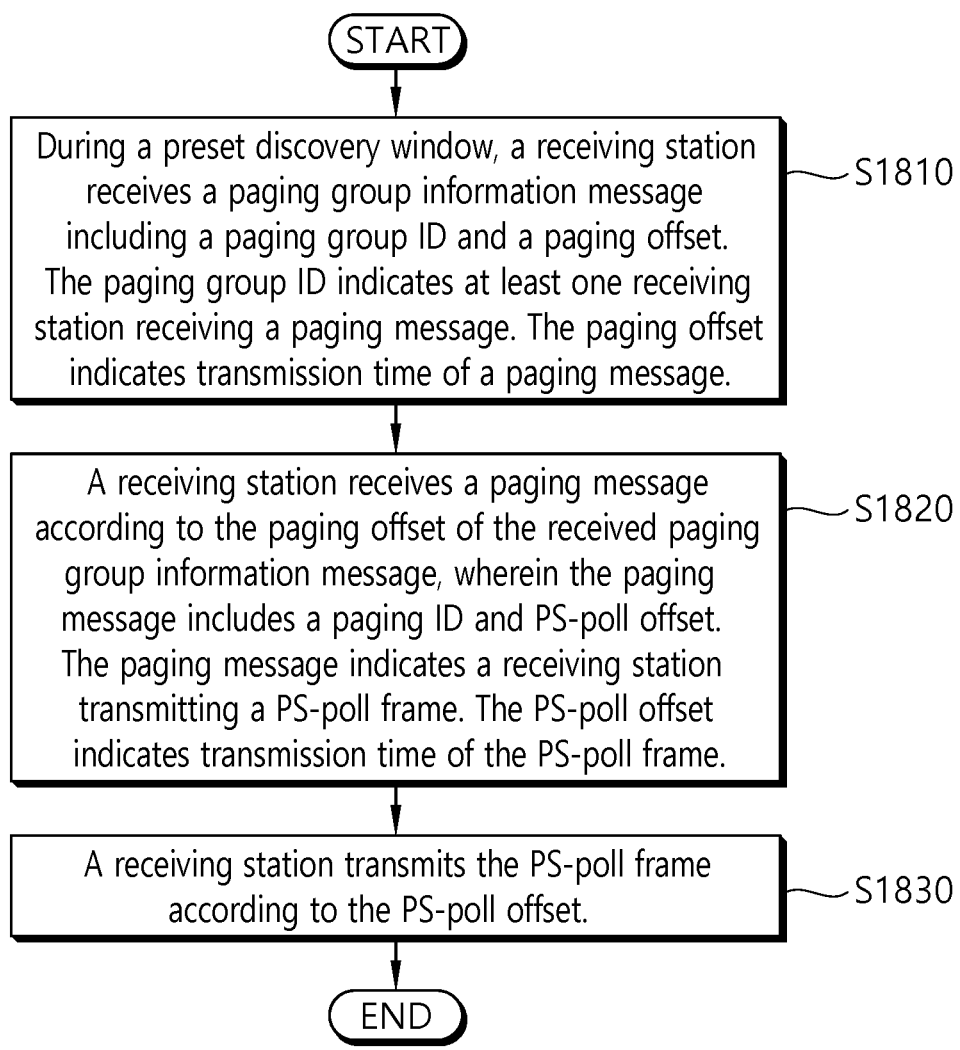
FIG. 18 is a flow diagram illustrating a procedure for performing a paging operation in the WLAN system according to an embodiment of the present invention.

FIG. 18 is a flow diagram illustrating a procedure for performing a paging operation in the WLAN system according to an embodiment of the present invention.

First of all, a preset discovery window (DW) may correspond to a discovery window set within an interval between current DWs. A receiving station may correspond to a NAN device to which an embodiment of the present invention is applied.

In the step of S1810, during a preset discovery window, a receiving station receives a paging group information message including a paging group ID and a paging offset. The paging group ID indicates at least one receiving station receiving a paging message. The paging offset indicates transmission time of a paging message. In other words, at least one receiving station may correspond to a group of NAN devices capable of receiving a paging message at the same time by applying the same paging offset. The paging group information message may be received by being included in a service discovery frame.

In the step of S1820, a receiving station receives a paging message according to the paging offset of the received paging group information message. A paging message includes a paging ID and PS-poll offset. The paging message indicates a receiving station transmitting a PS-poll frame. In other words, a paging ID is included in the paging message if there exists buffered traffic for the receiving station. The PS-poll offset indicates transmission time of a PS-poll frame.

In the step of S1830, a receiving station transmits a PS-poll frame at the transmission time indicated by the PS-poll offset. The receiving station may receive data after receiving an ACK with respect to the PS-poll frame. By doing so, a network connection among the NAN devices is performed.

Figure 19:
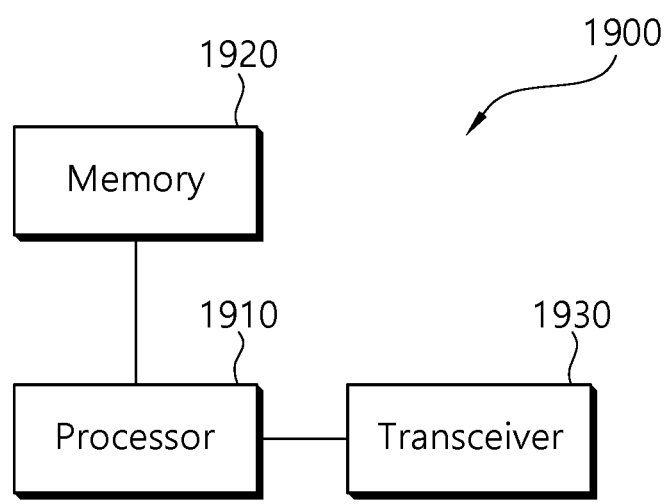
FIG. 19 is a block diagram of a wireless device in which an embodiment of the present invention may be implemented.

FIG. 19 is a block diagram of a wireless device in which an embodiment of the present invention may be implemented.

The wireless device 1900 comprises a processor 1910, memory 1920, and transceiver 1930. The wireless device may be a NAN device described in the embodiment of the present invention above. The transceiver 1930, being connected to the processor 1910, transmits and/or receives radio signals. The processor 1910 implements proposed functions, processes, and/or methods. In the embodiment described above, the operation of a NAN device may be implemented by the processor 1910. The memory 1920, being connected to the processor 1910, may store instructions for implementing the operation of the processor 1910.

The processor may include an application-specific integrated circuit (ASIC), another chip set, a logical circuit, a data processing device, and/or a converter converting a baseband signal and a radio signal to and from one another. The memory may include a read-only memory (ROM), a random access memory (RAM), a flash memory, a memory card, a storage medium, and/or another storage device. The RF unit may include one or more antennas transmitting and/or receiving radio signals.

When the exemplary embodiment is implemented as software, the above-described method may be implemented as a module (process, function, and so on) performing the above-described functions. The module may be stored in the memory and may be executed by the processor. The memory may be located inside or outside of the processor and may be connected to the processor through a diversity of well-known means.

In the exemplary system describe above, methods are described according to a flow diagram by using a series of steps and blocks. However, the present invention is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present invention.

What is claimed is:

1. A method for performing paging by a receiving station (STA) in a wireless LAN system, comprising:
   receiving a paging group information message including a paging group ID for at least one receiving STA receiving a paging message and a paging offset for transmission time of the paging message during a preset discovery window;
   receiving the paging message based on the paging offset of the received paging group information message,
   wherein the paging message includes a paging ID for a receiving STA transmitting a PS (Power Save)-poll frame and a PS-poll offset for transmission time of the PS-poll frame; and
   transmitting the PS-poll frame based on the PS-poll offset,
   wherein the paging group information message further includes multi-channel information,
   wherein the multi-channel information includes information on a first channel and a second channel,
   wherein the paging group information message is received through the first channel,
   wherein the paging message is received through the second channel, and
   wherein the PS-poll frame is transmitted through the second channel.

2. The method of claim 1, wherein when the paging message is received through the first channel, the paging message further includes the multi-channel information.

3. The method of claim 1, further comprising:
   entering an awake state to receive a control signal during the preset discovery window.

4. The method of claim 1, further comprising:
   entering a doze state after the preset discovery window until the paging message is received.

5. The method of claim 1, further comprising:
   entering a doze state after the paging message is received until the PS-poll frame is transmitted.

6. The method of claim 1, wherein the paging message further includes the paging group ID.

7. The method of claim 1, wherein the paging ID is included in the paging message when there is buffered traffic for the receiving STA.

8. The method of claim 1, wherein the paging group ID is assigned through a service discovery frame during an association and authentication procedure.

9. A wireless device operating in a WLAN system, comprising:
   a transceiver; and
   a processor, operatively coupled to the transceiver,
   wherein the processor is configured to:
      receive a paging group information message including a paging group ID for at least one receiving STA receiving a paging message and a paging offset for transmission time of the paging message during a preset discovery window;

receive the paging message based on the paging offset of the received paging group information message, wherein the paging message includes a paging ID for a receiving STA transmitting a PS (Power Save)-poll frame and a PS-poll offset indicating transmission time of the PS-poll frame; and transmit the PS-poll frame based on the PS-poll offset, wherein the paging group information message further includes multi-channel information, wherein the multi-channel information includes information on a first channel and a second channel, wherein the paging group information message is received through the first channel, wherein the paging message is received through the second channel, and wherein the PS-poll frame is transmitted through the second channel.

10. The wireless device of claim 9, wherein when the paging message is received through the first channel, the paging message further includes the multi-channel information.

11. The wireless device of claim 9, wherein the paging ID is included in the paging message when there is buffered traffic for the receiving STA.

* * * * *